United States Patent
Elliot et al.

(10) Patent No.: US 10,157,200 B2
(45) Date of Patent: Dec. 18, 2018

(54) INTERACTIVE USER INTERFACE FOR DYNAMIC DATA ANALYSIS EXPLORATION AND QUERY PROCESSING

(71) Applicant: Palantir Technologies Inc., Palo Alto, CA (US)

(72) Inventors: Mark Elliot, New York, NY (US); Benjamin Duffield, London (GB); Adam Borochoff, New York, NY (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 425 days.

(21) Appl. No.: 15/092,964

(22) Filed: Apr. 7, 2016

(65) Prior Publication Data

US 2017/0102863 A1 Apr. 13, 2017

Related U.S. Application Data

(63) Continuation of application No. 14/858,647, filed on Sep. 18, 2015, now Pat. No. 9,335,911.

(Continued)

(51) Int. Cl.
*G06F 17/30* (2006.01)
*G06F 3/0484* (2013.01)
(Continued)

(52) U.S. Cl.
CPC ...... *G06F 17/30392* (2013.01); *G06F 3/0482* (2013.01); *G06F 3/04817* (2013.01);
(Continued)

(58) Field of Classification Search
CPC ................................................ G06F 17/30392
(Continued)

(56) References Cited

U.S. PATENT DOCUMENTS

| 5,109,399 A | 4/1992 | Thompson |
| 5,329,108 A | 7/1994 | Lamoure |

(Continued)

FOREIGN PATENT DOCUMENTS

| CN | 102546446 | 7/2012 |
| CN | 103167093 | 6/2013 |

(Continued)

OTHER PUBLICATIONS

Brooks et al., "Hoptrees: Branching History Navigation for Hierarchies," Sep. 2, 2013, Network and Parallel Computing, pp. 316-333.

(Continued)

*Primary Examiner* — Reza Nabi
(74) *Attorney, Agent, or Firm* — Knobbe Martens Olson & Bear LLP

(57) ABSTRACT

The systems and methods described herein provide highly dynamic and interactive data analysis user interfaces which enable data analysts to quickly and efficiently explore large volume data sources. In particular, a data analysis system, such as described herein, may provide features to enable the data analyst to investigate large volumes of data over many different paths of analysis while maintaining detailed and retraceable steps taken by the data analyst over the course of an investigation, as captured via the data analyst's queries and user interaction with the user interfaces provided by the data analysis system. Data analysis paths may involve exploration of high volume data sets, such as Internet proxy data, which may include trillions of rows of data. The data analyst may pursue a data analysis path that involves, among other things, applying filters, joining to other tables in a database, viewing interactive data visualizations, and so on.

20 Claims, 16 Drawing Sheets

Related U.S. Application Data

(60) Provisional application No. 62/097,327, filed on Dec. 29, 2014.

(51) Int. Cl.
*G06F 3/0482* (2013.01)
*G06F 3/0481* (2013.01)

(52) U.S. Cl.
CPC ...... *G06F 3/04842* (2013.01); *G06F 3/04847* (2013.01); *G06F 17/30554* (2013.01); *G06F 17/30572* (2013.01)

(58) Field of Classification Search
USPC .......................................................... 715/771
See application file for complete search history.

(56) References Cited

U.S. PATENT DOCUMENTS

| | | | |
|---|---|---|---|
| 5,515,488 A * | 5/1996 | Hoppe | G06F 17/30572 345/440 |
| 5,632,009 A | 5/1997 | Rao et al. | |
| 5,670,987 A | 9/1997 | Doi et al. | |
| 5,781,704 A | 7/1998 | Rossmo | |
| 5,798,769 A | 8/1998 | Chiu et al. | |
| 5,845,300 A | 12/1998 | Comer | |
| 5,870,559 A * | 2/1999 | Leshem | G06F 11/32 707/E17.116 |
| 6,057,757 A | 5/2000 | Arrowsmith et al. | |
| 6,088,032 A * | 7/2000 | Mackinlay | G06F 17/30873 707/E17.111 |
| 6,091,956 A | 7/2000 | Hollenberg | |
| 6,144,962 A * | 11/2000 | Weinberg | G06F 11/32 |
| 6,161,098 A | 12/2000 | Wallman | |
| 6,219,053 B1 | 4/2001 | Tachibana et al. | |
| 6,232,971 B1 | 5/2001 | Haynes | |
| 6,247,019 B1 | 6/2001 | Davies | |
| 6,279,018 B1 | 8/2001 | Kudrolli et al. | |
| 6,341,310 B1 | 1/2002 | Leshem et al. | |
| 6,366,933 B1 | 4/2002 | Ball et al. | |
| 6,369,835 B1 | 4/2002 | Lin | |
| 6,430,305 B1 | 8/2002 | Decker | |
| 6,456,997 B1 | 9/2002 | Shukla | |
| 6,549,944 B1 | 4/2003 | Weinberg et al. | |
| 6,560,620 B1 | 5/2003 | Ching | |
| 6,581,068 B1 | 6/2003 | Bensoussan et al. | |
| 6,594,672 B1 | 7/2003 | Lampson et al. | |
| 6,631,496 B1 | 10/2003 | Li et al. | |
| 6,642,945 B1 | 11/2003 | Sharpe | |
| 6,674,434 B1 | 1/2004 | Chojnacki et al. | |
| 6,714,936 B1 | 3/2004 | Nevin, III | |
| 6,775,675 B1 | 8/2004 | Nwabueze et al. | |
| 6,820,135 B1 | 11/2004 | Dingman | |
| 6,828,920 B2 | 12/2004 | Owen et al. | |
| 6,839,745 B1 | 1/2005 | Dingari et al. | |
| 6,877,137 B1 | 4/2005 | Rivette et al. | |
| 6,900,807 B1 * | 5/2005 | Liongosari | G06F 17/30011 345/440 |
| 6,976,210 B1 | 12/2005 | Silva et al. | |
| 6,978,419 B1 | 12/2005 | Kantrowitz | |
| 6,980,984 B1 | 12/2005 | Huffman et al. | |
| 6,985,950 B1 | 1/2006 | Hanson et al. | |
| 7,020,847 B1 * | 3/2006 | Holzheuer | G06F 17/30014 345/441 |
| 7,036,085 B2 | 4/2006 | Barros | |
| 7,043,702 B2 | 5/2006 | Chi et al. | |
| 7,055,110 B2 | 5/2006 | Kupka et al. | |
| 7,139,800 B2 | 11/2006 | Bellotti et al. | |
| 7,158,878 B2 | 1/2007 | Rasmussen et al. | |
| 7,162,475 B2 | 1/2007 | Ackerman | |
| 7,168,039 B2 | 1/2007 | Bertram | |
| 7,171,427 B2 | 1/2007 | Witkowski | |
| 7,269,786 B1 | 9/2007 | Malloy et al. | |
| 7,278,105 B1 | 10/2007 | Kitts | |
| 7,290,698 B2 | 11/2007 | Poslinski et al. | |
| 7,333,998 B2 | 2/2008 | Heckerman et al. | |
| 7,370,047 B2 | 5/2008 | Gorman | |
| 7,379,811 B2 | 5/2008 | Rasmussen et al. | |
| 7,379,903 B2 | 5/2008 | Caballero et al. | |
| 7,426,654 B2 | 9/2008 | Adams et al. | |
| 7,454,466 B2 | 11/2008 | Bellotti et al. | |
| 7,461,077 B1 * | 12/2008 | Greenwood | G06F 3/0482 |
| 7,467,375 B2 | 12/2008 | Tondreau et al. | |
| 7,487,139 B2 | 2/2009 | Fraleigh et al. | |
| 7,502,786 B2 | 3/2009 | Liu et al. | |
| 7,525,422 B2 | 4/2009 | Bishop et al. | |
| 7,529,727 B2 | 5/2009 | Arning et al. | |
| 7,529,734 B2 | 5/2009 | Dirisala | |
| 7,558,677 B2 | 6/2009 | Jones | |
| 7,574,409 B2 | 8/2009 | Patinkin | |
| 7,574,428 B2 | 8/2009 | Leiserowitz et al. | |
| 7,579,965 B2 | 8/2009 | Bucholz | |
| 7,596,285 B2 | 9/2009 | Brown et al. | |
| 7,614,006 B2 | 11/2009 | Molander | |
| 7,617,185 B2 * | 11/2009 | Werner | G06F 17/30991 |
| 7,617,232 B2 | 11/2009 | Gabbert et al. | |
| 7,620,628 B2 | 11/2009 | Kapur et al. | |
| 7,624,122 B2 * | 11/2009 | Gaurav | G06F 17/30967 |
| 7,627,812 B2 | 12/2009 | Chamberlain et al. | |
| 7,634,717 B2 | 12/2009 | Chamberlain et al. | |
| 7,703,021 B1 | 4/2010 | Flam | |
| 7,706,817 B2 | 4/2010 | Bamrah et al. | |
| 7,712,049 B2 | 5/2010 | Williams et al. | |
| 7,716,077 B1 | 5/2010 | Mikurak | |
| 7,725,530 B2 | 5/2010 | Sah et al. | |
| 7,725,547 B2 | 5/2010 | Albertson et al. | |
| 7,730,082 B2 | 6/2010 | Sah et al. | |
| 7,730,109 B2 | 6/2010 | Rohrs et al. | |
| 7,756,843 B1 | 7/2010 | Palmer | |
| 7,770,100 B2 | 8/2010 | Chamberlain et al. | |
| 7,805,457 B1 | 9/2010 | Viola et al. | |
| 7,809,703 B2 | 10/2010 | Balabhadrapatruni et al. | |
| 7,818,291 B2 | 10/2010 | Ferguson et al. | |
| 7,818,658 B2 | 10/2010 | Chen | |
| 7,870,493 B2 | 1/2011 | Pall et al. | |
| 7,894,984 B2 | 2/2011 | Rasmussen et al. | |
| 7,899,611 B2 | 3/2011 | Downs et al. | |
| 7,899,796 B1 | 3/2011 | Borthwick et al. | |
| 7,917,376 B2 | 3/2011 | Bellin et al. | |
| 7,920,963 B2 | 4/2011 | Jouline et al. | |
| 7,933,862 B2 | 4/2011 | Chamberlain et al. | |
| 7,941,321 B2 | 5/2011 | Greenstein et al. | |
| 7,962,281 B2 | 6/2011 | Rasmussen et al. | |
| 7,962,495 B2 | 6/2011 | Jain et al. | |
| 7,962,848 B2 | 6/2011 | Bertram | |
| 7,970,240 B1 | 6/2011 | Chao et al. | |
| 7,971,150 B2 | 6/2011 | Raskutti et al. | |
| 7,984,374 B2 | 6/2011 | Caro et al. | |
| 8,001,465 B2 | 8/2011 | Kudrolli et al. | |
| 8,001,482 B2 | 8/2011 | Bhattiprolu et al. | |
| 8,010,545 B2 | 8/2011 | Stefik et al. | |
| 8,015,487 B2 | 9/2011 | Roy et al. | |
| 8,019,749 B2 * | 9/2011 | Leban | G06F 17/30991 707/713 |
| 8,024,778 B2 | 9/2011 | Cash et al. | |
| 8,036,632 B1 | 10/2011 | Cona et al. | |
| 8,036,971 B2 | 10/2011 | Aymeloglu et al. | |
| 8,037,046 B2 * | 10/2011 | Udezue | G06F 17/30997 707/706 |
| 8,042,110 B1 | 10/2011 | Kawahara et al. | |
| 8,046,283 B2 | 10/2011 | Burns | |
| 8,054,756 B2 | 11/2011 | Chand et al. | |
| 8,103,543 B1 | 1/2012 | Zwicky | |
| 8,134,457 B2 | 3/2012 | Velipasalar et al. | |
| 8,145,703 B2 | 3/2012 | Frishert et al. | |
| 8,185,819 B2 | 5/2012 | Sah et al. | |
| 8,214,361 B1 | 7/2012 | Sandler et al. | |
| 8,214,490 B1 | 7/2012 | Vos et al. | |
| 8,214,764 B2 | 7/2012 | Gemmell et al. | |
| 8,225,201 B2 | 7/2012 | Michael | |
| 8,229,902 B2 | 7/2012 | Vishniac et al. | |
| 8,229,947 B2 | 7/2012 | Fujinaga | |
| 8,230,333 B2 | 7/2012 | Decherd et al. | |

(56) References Cited

U.S. PATENT DOCUMENTS

| | | |
|---|---|---|
| 8,249,885 B2 * | 8/2012 | Berkowitz ........ G06F 17/30873 705/1.1 |
| 8,271,461 B2 | 9/2012 | Pike et al. |
| 8,280,880 B1 | 10/2012 | Aymeloglu et al. |
| 8,290,838 B1 | 10/2012 | Thakur et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,352,881 B2 | 1/2013 | Champion et al. |
| 8,368,695 B2 | 2/2013 | Howell et al. |
| 8,386,377 B1 | 2/2013 | Xiong et al. |
| 8,397,171 B2 | 3/2013 | Klassen et al. |
| 8,412,707 B1 | 4/2013 | Mianji |
| 8,447,722 B1 | 5/2013 | Ahuja et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,489,331 B2 | 7/2013 | Kopf et al. |
| 8,489,641 B1 * | 7/2013 | Seefeld ............ G06F 17/30241 707/792 |
| 8,494,984 B2 | 7/2013 | Hwang et al. |
| 8,510,743 B2 | 8/2013 | Hackborn et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,413 B1 | 10/2013 | Quarterman |
| 8,577,911 B1 | 11/2013 | Stepinski et al. |
| 8,589,273 B2 | 11/2013 | Creeden et al. |
| 8,595,234 B2 | 11/2013 | Siripurapu et al. |
| 8,620,641 B2 | 12/2013 | Farnsworth et al. |
| 8,646,080 B2 | 2/2014 | Williamson et al. |
| 8,639,757 B1 | 3/2014 | Adams et al. |
| 8,676,857 B1 | 3/2014 | Adams et al. |
| 8,688,573 B1 | 4/2014 | Rukonic et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,788,407 B1 | 7/2014 | Singh et al. |
| 8,799,799 B1 * | 8/2014 | Cervelli ............ G06F 3/0481 715/765 |
| 8,806,355 B2 * | 8/2014 | Twiss .............. G06Q 10/10 715/751 |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,917,274 B2 | 12/2014 | Ma et al. |
| 8,924,388 B2 | 12/2014 | Elliot et al. |
| 8,924,389 B2 | 12/2014 | Elliot et al. |
| 8,924,872 B1 | 12/2014 | Bogomolov et al. |
| 8,937,619 B2 | 1/2015 | Sharma et al. |
| 8,938,686 B1 | 1/2015 | Erenrich et al. |
| 8,949,164 B1 | 2/2015 | Mohler |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,069,842 B2 | 6/2015 | Melby |
| 9,100,428 B1 | 8/2015 | Visbal |
| 9,111,281 B2 * | 8/2015 | Stibel ............... G06Q 30/018 |
| 9,116,975 B2 | 8/2015 | Shankar et al. |
| 9,129,219 B1 | 9/2015 | Robertson et al. |
| 9,256,664 B2 | 2/2016 | Chakerian et al. |
| 9,280,618 B1 * | 3/2016 | Bruce ............... G06Q 10/00 |
| 9,286,373 B2 | 3/2016 | Elliot et al. |
| 9,335,911 B1 * | 5/2016 | Elliot ............... G06F 17/30572 |
| 9,483,745 B2 * | 11/2016 | Ackermann ........... G06Q 10/06 |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095360 A1 | 7/2002 | Joao |
| 2002/0095658 A1 | 7/2002 | Shulman |
| 2002/0103705 A1 | 8/2002 | Brady |
| 2002/0116120 A1 | 8/2002 | Ruiz et al. |
| 2002/0147805 A1 | 10/2002 | Leshem et al. |
| 2002/0174201 A1 | 11/2002 | Ramer et al. |
| 2002/0194119 A1 | 12/2002 | Wright et al. |
| 2003/0028560 A1 | 2/2003 | Kudrolli et al. |
| 2003/0036848 A1 | 2/2003 | Sheha et al. |
| 2003/0039948 A1 | 2/2003 | Donahue |
| 2003/0126102 A1 | 7/2003 | Borthwick |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0200217 A1 | 10/2003 | Ackerman |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0034570 A1 | 2/2004 | Davis |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0111480 A1 | 6/2004 | Yue |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0153418 A1 | 8/2004 | Hanweck |
| 2004/0163039 A1 | 8/2004 | McPherson et al. |
| 2004/0193600 A1 | 9/2004 | Kaasten et al. |
| 2004/0221223 A1 | 11/2004 | Yu et al. |
| 2004/0236688 A1 | 11/2004 | Bozeman |
| 2004/0260702 A1 | 12/2004 | Cragun et al. |
| 2004/0267746 A1 | 12/2004 | Marcjan et al. |
| 2005/0010472 A1 | 1/2005 | Quatse et al. |
| 2005/0027705 A1 | 2/2005 | Sadri et al. |
| 2005/0028094 A1 | 2/2005 | Allyn |
| 2005/0039119 A1 | 2/2005 | Parks et al. |
| 2005/0065811 A1 | 3/2005 | Chu et al. |
| 2005/0080769 A1 | 4/2005 | Gemmell |
| 2005/0080770 A1 * | 4/2005 | Lueder ............... G06F 3/0481 |
| 2005/0086207 A1 | 4/2005 | Heuer et al. |
| 2005/0125715 A1 | 6/2005 | Franco et al. |
| 2005/0154628 A1 | 7/2005 | Eckart et al. |
| 2005/0154769 A1 | 7/2005 | Eckart et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0246327 A1 | 11/2005 | Yeung et al. |
| 2005/0251786 A1 | 11/2005 | Citron et al. |
| 2006/0026120 A1 | 2/2006 | Carolan et al. |
| 2006/0026170 A1 * | 2/2006 | Kreitler ............. G06F 17/30241 |
| 2006/0059139 A1 | 3/2006 | Robinson |
| 2006/0074881 A1 | 4/2006 | Vembu et al. |
| 2006/0080283 A1 | 4/2006 | Shipman |
| 2006/0080619 A1 | 4/2006 | Carlson et al. |
| 2006/0093222 A1 | 5/2006 | Saffer et al. |
| 2006/0129746 A1 | 6/2006 | Porter |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0149596 A1 | 7/2006 | Surpin et al. |
| 2006/0203337 A1 | 9/2006 | White |
| 2006/0218637 A1 | 9/2006 | Thomas et al. |

(56) References Cited

U.S. PATENT DOCUMENTS

| | | |
|---|---|---|
| 2006/0241974 A1 | 10/2006 | Chao et al. |
| 2006/0242040 A1 | 10/2006 | Rader |
| 2006/0242630 A1 | 10/2006 | Koike et al. |
| 2006/0271277 A1 | 11/2006 | Hu et al. |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0011304 A1 | 1/2007 | Error |
| 2007/0016363 A1 | 1/2007 | Huang et al. |
| 2007/0038646 A1 | 2/2007 | Thota |
| 2007/0038962 A1 | 2/2007 | Fuchs et al. |
| 2007/0057966 A1 | 3/2007 | Ohno et al. |
| 2007/0078832 A1 | 4/2007 | Ott et al. |
| 2007/0083541 A1 | 4/2007 | Fraleigh et al. |
| 2007/0088596 A1 | 4/2007 | Berkelhamer et al. |
| 2007/0094389 A1 | 4/2007 | Nussey et al. |
| 2007/0112737 A1* | 5/2007 | Carlson ............ G06F 17/30483 |
| 2007/0150369 A1 | 6/2007 | Zivin |
| 2007/0150801 A1 | 6/2007 | Chidlovskii et al. |
| 2007/0156673 A1 | 7/2007 | Maga |
| 2007/0162454 A1 | 7/2007 | D'Albora et al. |
| 2007/0174760 A1 | 7/2007 | Chamberlain et al. |
| 2007/0185867 A1 | 8/2007 | Maga |
| 2007/0192122 A1 | 8/2007 | Routson et al. |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0240062 A1 | 10/2007 | Christena et al. |
| 2007/0266336 A1 | 11/2007 | Nojima et al. |
| 2007/0284433 A1 | 12/2007 | Domenica et al. |
| 2007/0294643 A1 | 12/2007 | Kyle |
| 2008/0040275 A1 | 2/2008 | Paulsen et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0065655 A1* | 3/2008 | Chakravarthy ... G06F 17/30525 |
| 2008/0065665 A1 | 3/2008 | Pomroy et al. |
| 2008/0069081 A1 | 3/2008 | Chand et al. |
| 2008/0077597 A1 | 3/2008 | Butler |
| 2008/0077642 A1* | 3/2008 | Carbone ............ G06F 17/30241 709/203 |
| 2008/0082486 A1 | 4/2008 | Lermant et al. |
| 2008/0103996 A1 | 5/2008 | Forman et al. |
| 2008/0104019 A1 | 5/2008 | Nath |
| 2008/0126951 A1 | 5/2008 | Sood et al. |
| 2008/0148398 A1 | 6/2008 | Mezack et al. |
| 2008/0155440 A1 | 6/2008 | Trevor et al. |
| 2008/0162616 A1 | 7/2008 | Gross et al. |
| 2008/0195417 A1 | 8/2008 | Surpin et al. |
| 2008/0195608 A1 | 8/2008 | Clover |
| 2008/0208735 A1 | 8/2008 | Balet et al. |
| 2008/0222295 A1 | 9/2008 | Robinson et al. |
| 2008/0243711 A1 | 10/2008 | Aymeloglu et al. |
| 2008/0249983 A1 | 10/2008 | Meisels et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0270328 A1 | 10/2008 | Lafferty et al. |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0288475 A1 | 11/2008 | Kim et al. |
| 2008/0294663 A1* | 11/2008 | Heinley ............ G06F 3/0481 |
| 2008/0301559 A1 | 12/2008 | Martinsen et al. |
| 2008/0301643 A1 | 12/2008 | Appleton et al. |
| 2008/0313132 A1 | 12/2008 | Hao et al. |
| 2008/0313281 A1 | 12/2008 | Scheidl et al. |
| 2009/0002492 A1 | 1/2009 | Velipasalar et al. |
| 2009/0027418 A1 | 1/2009 | Maru et al. |
| 2009/0030915 A1 | 1/2009 | Winter et al. |
| 2009/0037912 A1 | 2/2009 | Stoitsev et al. |
| 2009/0043762 A1* | 2/2009 | Shiverick .......... G06F 17/30395 |
| 2009/0055251 A1 | 2/2009 | Shah et al. |
| 2009/0076845 A1 | 3/2009 | Bellin et al. |
| 2009/0088964 A1 | 4/2009 | Schaaf et al. |
| 2009/0094166 A1 | 4/2009 | Aymeloglu et al. |
| 2009/0094270 A1 | 4/2009 | Alirez et al. |
| 2009/0106178 A1 | 4/2009 | Chu |
| 2009/0112745 A1 | 4/2009 | Stefanescu |
| 2009/0119309 A1 | 5/2009 | Gibson et al. |
| 2009/0125359 A1 | 5/2009 | Knapic |
| 2009/0125369 A1 | 5/2009 | Kloostra et al. |
| 2009/0125459 A1 | 5/2009 | Norton et al. |
| 2009/0132921 A1* | 5/2009 | Hwangbo ............ G06F 3/0482 715/716 |
| 2009/0132953 A1* | 5/2009 | Reed, Jr. ............... G06F 3/0481 715/781 |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0157732 A1 | 6/2009 | Hao et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Whyte et al. |
| 2009/0187548 A1 | 7/2009 | Ji et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0234720 A1 | 9/2009 | George et al. |
| 2009/0249244 A1 | 10/2009 | Robinson et al. |
| 2009/0254572 A1* | 10/2009 | Redlich ................. G06Q 10/06 |
| 2009/0254842 A1* | 10/2009 | Leacock ............ H04L 12/1827 715/757 |
| 2009/0254970 A1 | 10/2009 | Agarwal et al. |
| 2009/0259636 A1 | 10/2009 | Labrou et al. |
| 2009/0271343 A1 | 10/2009 | Vaiciulis et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2009/0307049 A1 | 12/2009 | Elliott et al. |
| 2009/0313463 A1 | 12/2009 | Pang et al. |
| 2009/0319418 A1 | 12/2009 | Herz |
| 2009/0319515 A1 | 12/2009 | Minton et al. |
| 2009/0319891 A1 | 12/2009 | MacKinlay |
| 2010/0004857 A1 | 1/2010 | Pereira et al. |
| 2010/0011282 A1 | 1/2010 | Dollard et al. |
| 2010/0030722 A1* | 2/2010 | Goodson ............... G06Q 30/02 706/54 |
| 2010/0031141 A1 | 2/2010 | Summers et al. |
| 2010/0042922 A1 | 2/2010 | Bradateanu et al. |
| 2010/0057622 A1 | 3/2010 | Faith et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0076979 A1* | 3/2010 | Wang ................. G06F 17/30424 707/740 |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0106752 A1 | 4/2010 | Eckardt et al. |
| 2010/0114887 A1 | 5/2010 | Conway et al. |
| 2010/0114916 A1* | 5/2010 | Cooke ................. G06F 17/30873 707/752 |
| 2010/0122152 A1 | 5/2010 | Chamberlain et al. |
| 2010/0131457 A1 | 5/2010 | Heimendinger |
| 2010/0131502 A1 | 5/2010 | Fordham |
| 2010/0161735 A1 | 6/2010 | Sharma |
| 2010/0162176 A1 | 6/2010 | Dunton |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0211535 A1* | 8/2010 | Rosenberger ..... G06F 17/30038 706/20 |

(56) References Cited

U.S. PATENT DOCUMENTS

| | | |
|---|---|---|
| 2010/0228812 A1* | 9/2010 | Uomini ............... G06Q 10/00 709/203 |
| 2010/0235915 A1 | 9/2010 | Memon et al. |
| 2010/0250412 A1 | 9/2010 | Wagner |
| 2010/0262688 A1 | 10/2010 | Hussain et al. |
| 2010/0280857 A1 | 11/2010 | Liu et al. |
| 2010/0293174 A1* | 11/2010 | Bennett ............ G06F 17/30707 707/759 |
| 2010/0306713 A1 | 12/2010 | Geisner et al. |
| 2010/0312837 A1 | 12/2010 | Bodapati et al. |
| 2010/0313119 A1 | 12/2010 | Baldwin et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0004498 A1 | 1/2011 | Readshaw |
| 2011/0029526 A1 | 2/2011 | Knight et al. |
| 2011/0040776 A1 | 2/2011 | Najm et al. |
| 2011/0047159 A1 | 2/2011 | Baid et al. |
| 2011/0060753 A1 | 3/2011 | Shaked et al. |
| 2011/0061013 A1 | 3/2011 | Bilicki et al. |
| 2011/0066933 A1 | 3/2011 | Ludwig |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0167105 A1 | 7/2011 | Ramakrishnan et al. |
| 2011/0167710 A1 | 7/2011 | Ramakrishnan et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0185316 A1 | 7/2011 | Reid et al. |
| 2011/0208565 A1 | 8/2011 | Ross et al. |
| 2011/0208724 A1* | 8/2011 | Jones ............... G06F 17/30241 707/723 |
| 2011/0213655 A1 | 9/2011 | Henkin |
| 2011/0218934 A1 | 9/2011 | Elser |
| 2011/0218955 A1 | 9/2011 | Tang |
| 2011/0219450 A1 | 9/2011 | McDougal et al. |
| 2011/0225198 A1 | 9/2011 | Edwards et al. |
| 2011/0238495 A1 | 9/2011 | Kang |
| 2011/0238553 A1 | 9/2011 | Raj et al. |
| 2011/0251951 A1 | 10/2011 | Kolkowitz |
| 2011/0258158 A1 | 10/2011 | Resende et al. |
| 2011/0270604 A1 | 11/2011 | Qi et al. |
| 2011/0270705 A1 | 11/2011 | Parker |
| 2011/0270834 A1 | 11/2011 | Sokolan et al. |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0295649 A1 | 12/2011 | Fine |
| 2011/0310005 A1 | 12/2011 | Chen et al. |
| 2011/0314007 A1 | 12/2011 | Dassa et al. |
| 2011/0314024 A1 | 12/2011 | Chang et al. |
| 2012/0004904 A1 | 1/2012 | Shin et al. |
| 2012/0011238 A1 | 1/2012 | Rathod |
| 2012/0011245 A1 | 1/2012 | Gillette et al. |
| 2012/0019559 A1 | 1/2012 | Siler et al. |
| 2012/0022945 A1 | 1/2012 | Falkenborg et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0084117 A1 | 4/2012 | Tavares et al. |
| 2012/0084118 A1 | 4/2012 | Bai et al. |
| 2012/0084287 A1 | 4/2012 | Lakshminarayan et al. |
| 2012/0089606 A1 | 4/2012 | Eshwar et al. |
| 2012/0106801 A1 | 5/2012 | Jackson |
| 2012/0117082 A1 | 5/2012 | Koperda et al. |
| 2012/0131512 A1 | 5/2012 | Takeuchi et al. |
| 2012/0137235 A1 | 5/2012 | Ts et al. |
| 2012/0144335 A1* | 6/2012 | Abeln ............... G06Q 10/06 715/771 |
| 2012/0158527 A1 | 6/2012 | Cannelongo et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0170847 A1 | 7/2012 | Tsukidate |
| 2012/0173381 A1 | 7/2012 | Smith |
| 2012/0173985 A1 | 7/2012 | Peppel |
| 2012/0180002 A1 | 7/2012 | Campbell et al. |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0203708 A1 | 8/2012 | Psota et al. |
| 2012/0208636 A1 | 8/2012 | Feige |
| 2012/0215784 A1 | 8/2012 | King et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226523 A1 | 9/2012 | Weiss |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0266245 A1 | 10/2012 | McDougal et al. |
| 2012/0284345 A1 | 11/2012 | Costenaro et al. |
| 2012/0290879 A1 | 11/2012 | Shibuya et al. |
| 2012/0296907 A1 | 11/2012 | Long et al. |
| 2012/0304244 A1 | 11/2012 | Xie et al. |
| 2012/0311684 A1 | 12/2012 | Paulsen et al. |
| 2012/0323829 A1 | 12/2012 | Stokes et al. |
| 2012/0323888 A1 | 12/2012 | Osann, Jr. |
| 2012/0323889 A1* | 12/2012 | Marum ............ G06F 17/30554 707/722 |
| 2012/0330801 A1 | 12/2012 | McDougal et al. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0016106 A1 | 1/2013 | Yip et al. |
| 2013/0018796 A1 | 1/2013 | Kolhatkar et al. |
| 2013/0024268 A1 | 1/2013 | Manickavelu |
| 2013/0046635 A1 | 2/2013 | Grigg et al. |
| 2013/0046842 A1 | 2/2013 | Muntz et al. |
| 2013/0054306 A1 | 2/2013 | Bhalla |
| 2013/0055145 A1 | 2/2013 | Antony et al. |
| 2013/0057551 A1 | 3/2013 | Ebert et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0096988 A1 | 4/2013 | Grossman et al. |
| 2013/0097482 A1 | 4/2013 | Marantz et al. |
| 2013/0110746 A1 | 5/2013 | Ahn |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117651 A1 | 5/2013 | Waldman et al. |
| 2013/0101159 A1 | 6/2013 | Rosen |
| 2013/0150004 A1 | 6/2013 | Rosen |
| 2013/0151148 A1 | 6/2013 | Parundekar et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0166348 A1 | 6/2013 | Scotto |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |

(56) References Cited

U.S. PATENT DOCUMENTS

| | | |
|---|---|---|
| 2013/0185245 A1 | 7/2013 | Anderson |
| 2013/0185307 A1 | 7/2013 | El-Yaniv et al. |
| 2013/0218879 A1 | 8/2013 | Park et al. |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226953 A1 | 8/2013 | Markovich et al. |
| 2013/0232045 A1 | 9/2013 | Tai |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0251233 A1 | 9/2013 | Yang et al. |
| 2013/0208565 A1 | 10/2013 | Castellanos et al. |
| 2013/0262527 A1 | 10/2013 | Hunter et al. |
| 2013/0262528 A1 | 10/2013 | Foit |
| 2013/0263019 A1 | 10/2013 | Castellanos et al. |
| 2013/0267207 A1 | 10/2013 | Hao et al. |
| 2013/0268520 A1* | 10/2013 | Fisher ............... G06F 17/30554 707/723 |
| 2013/0279757 A1 | 10/2013 | Kephart |
| 2013/0282696 A1 | 10/2013 | John et al. |
| 2013/0288719 A1 | 10/2013 | Alonzo |
| 2013/0290011 A1 | 10/2013 | Lynn et al. |
| 2013/0290825 A1 | 10/2013 | Arndt et al. |
| 2013/0297619 A1 | 11/2013 | Chandarsekaran et al. |
| 2013/0304770 A1 | 11/2013 | Boero et al. |
| 2013/0311375 A1 | 11/2013 | Priebatsch |
| 2013/0318604 A1 | 11/2013 | Coates et al. |
| 2014/0012796 A1 | 1/2014 | Petersen et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0053091 A1* | 2/2014 | Hou ............... G06F 17/30389 715/769 |
| 2014/0058914 A1 | 2/2014 | Song et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0081685 A1 | 3/2014 | Thacker et al. |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0129261 A1 | 5/2014 | Bothwell et al. |
| 2014/0136285 A1 | 5/2014 | Carvalho |
| 2014/0143009 A1 | 5/2014 | Brice et al. |
| 2014/0149436 A1 | 5/2014 | Bahrami et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0189870 A1 | 7/2014 | Singla et al. |
| 2014/0195515 A1 | 7/2014 | Baker et al. |
| 2014/0195887 A1 | 7/2014 | Ellis et al. |
| 2014/0214579 A1 | 7/2014 | Shen et al. |
| 2014/0214810 A1* | 7/2014 | Takeda ............... G06F 17/30395 707/722 |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0244388 A1 | 8/2014 | Manouchehri et al. |
| 2014/0250377 A1* | 9/2014 | Bisca ............... G06F 17/30011 715/705 |
| 2014/0258246 A1 | 9/2014 | Lo Faro et al. |
| 2014/0267294 A1 | 9/2014 | Ma |
| 2014/0267295 A1 | 9/2014 | Sharma |
| 2014/0279824 A1 | 9/2014 | Tamayo |
| 2014/0280056 A1 | 9/2014 | Kelly |
| 2014/0282160 A1 | 9/2014 | Zarpas |
| 2014/0310266 A1 | 10/2014 | Greenfield |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0351070 A1 | 11/2014 | Christner et al. |
| 2014/0358829 A1 | 12/2014 | Hurwitz |
| 2014/0366132 A1 | 12/2014 | Stiansen et al. |
| 2014/0372956 A1* | 12/2014 | Bisca ............... G06F 17/30958 715/848 |
| 2015/0019394 A1 | 1/2015 | Unser et al. |
| 2015/0046870 A1* | 2/2015 | Goldenberg ............... G06F 3/0481 715/786 |
| 2015/0073929 A1 | 3/2015 | Psota et al. |
| 2015/0073954 A1 | 3/2015 | Braff |
| 2015/0089424 A1* | 3/2015 | Duffield ............... G06Q 10/00 715/771 |
| 2015/0095773 A1 | 4/2015 | Gonsalves et al. |
| 2015/0100897 A1 | 4/2015 | Sun et al. |
| 2015/0100907 A1 | 4/2015 | Erenrich et al. |
| 2015/0106170 A1* | 4/2015 | Bonica ............... G06F 17/3053 705/12 |
| 2015/0106379 A1 | 4/2015 | Elliot et al. |
| 2015/0134599 A1* | 5/2015 | Banerjee ............... G06F 17/30592 707/607 |
| 2015/0134666 A1 | 5/2015 | Gattiker et al. |
| 2015/0135256 A1 | 5/2015 | Hoy et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178825 A1 | 6/2015 | Huerta |
| 2015/0178877 A1 | 6/2015 | Bogomolov et al. |
| 2015/0186821 A1 | 7/2015 | Wang et al. |
| 2015/0187036 A1 | 7/2015 | Wang et al. |
| 2015/0188872 A1 | 7/2015 | White |
| 2015/0227295 A1 | 8/2015 | Meiklejohn et al. |
| 2015/0242401 A1 | 8/2015 | Liu |
| 2015/0309719 A1 | 10/2015 | Ma et al. |
| 2015/0317342 A1 | 11/2015 | Grossman et al. |
| 2015/0324868 A1 | 11/2015 | Kaftan et al. |
| 2015/0338233 A1* | 11/2015 | Cervelli ............... G06F 17/30241 701/532 |
| 2015/0379413 A1 | 12/2015 | Robertson et al. |
| 2016/0004764 A1 | 1/2016 | Chakerian et al. |
| 2016/0034463 A1* | 2/2016 | Brewer ............... H04L 43/12 707/734 |
| 2016/0180557 A1 | 6/2016 | Yousaf et al. |
| 2017/0116259 A1 | 4/2017 | Elliot et al. |

FOREIGN PATENT DOCUMENTS

| | | |
|---|---|---|
| CN | 102054015 | 5/2014 |
| DE | 102014103482 | 9/2014 |
| DE | 102014204827 | 9/2014 |
| DE | 102014204830 | 9/2014 |
| DE | 102014204834 | 9/2014 |
| DE | 102014215621 | 2/2015 |
| EP | 1672527 | 6/2006 |
| EP | 2487610 | 8/2012 |
| EP | 2551799 | 1/2013 |
| EP | 2560134 | 2/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2881868 | 6/2015 |
| EP | 2884439 | 6/2015 |
| EP | 2884440 | 6/2015 |
| EP | 2889814 | 7/2015 |
| EP | 2891992 | 7/2015 |

(56) References Cited

FOREIGN PATENT DOCUMENTS

| | | |
|---|---|---|
| EP | 2892197 | 7/2015 |
| EP | 2911078 | 8/2015 |
| EP | 2911100 | 8/2015 |
| EP | 2940603 | 11/2015 |
| EP | 2940609 | 11/2015 |
| EP | 2963595 | 1/2016 |
| EP | 2996053 | 3/2016 |
| EP | 3035214 | 6/2016 |
| EP | 3038002 | 6/2016 |
| EP | 3040885 | 7/2016 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 00/009529 | 2/2000 |
| WO | WO 02/065353 | 8/2002 |
| WO | WO 2005/104736 | 11/2005 |
| WO | WO 2005/116851 | 12/2005 |
| WO | WO 2008/064207 | 5/2008 |
| WO | WO 2009/061501 | 5/2009 |
| WO | WO 2010/000014 | 1/2010 |
| WO | WO 2010/030913 | 3/2010 |
| WO | WO 2012/061162 | 5/2012 |
| WO | WO 2013/010157 | 1/2013 |
| WO | WO 2013/102892 | 7/2013 |

OTHER PUBLICATIONS

IBM Predictive Analytics, https://www.ibm.com/analytics/us/en/technology/predictive-analytics/, as printed Feb. 15, 2017 in 12 pages.

IBM SPSS Modeler, https://www.ibm.com/us-en/marketplace/spss-modeler, as printed Feb. 15, 2017 in 5 pages.

IBM Analytics, "IBM SPSS software and Watson Analytics: A powerful combo for the cognitive age," available at https://www.youtube.com/watch?v=AvYctzFf8gc, as published on Apr. 14, 2016.

Armand Ruiz, "Watson Analytics, SPSS Modeler and Esri ArcGIS," available at https://www.youtube.com/watch?v=fk49hw4OrN4, as published on Jul. 28, 2015.

IBM Knowledge Center, "Merge Node," https://www.ibm.com/support/knowledgecenter/en/SS3RA7_15.0.0/com.ibm.spss.modeler.help/merge_overview.htm[ibm.com], as printed Feb. 14, 2017 in 1 page.

IBM Knowledge Center, "New features in IBM SPSS Modeler Professional," https://www.ibm.com/support/knowledgecenter/en/SS3RA7_15.0.0/com.ibm.spss.modeler.help/whatsnew_features_pro.htm[ibm.com], as printed Feb. 14, 2017 in 2 pages.

IBM Knowledge Center, "Overview—What's new in IBM Watson Explorer Content Analytics Version 10.0," https://www.ibm.com/support/knowledgecenter/en/SS8NLW_10.0.0/com.ibm.discovery.es.nav.doc/iiysawhatsnew.htm, as printed Mar. 6, 2017 in 4 pages.

Yates, Rob, "Introducing the IBM Watson Natural Language Classifier," IBM developerWorks/Developer Centers, posted Jul. 10, 2015 in 4 pages, https://developer.ibm.com/watson/blog/2015/07/10/the-ibm-watson-natural-language-classifier/.

Goyal, Manish, "Announcing our largest release of Watson Developer Cloud services," IBM developerWorks/Developer Centers, posted Sep. 24, 2015 in 6 pages, https://developer.ibm.com/watson/blog/2015/09/24/announcing-our-largest-release-of-watson-developer-cloud-services/.

IBM Analytics Communities, "Is IBM SPSS statistics now integrated to WatsonAnalytics?" https://community.watsonanalytics.com/discussions/questions/1464/is-ibm-spss-statistics-now-integrated-to-watsonana.html, as printed Mar. 7, 2017 in 2 pages.

IBM Support, "Software lifecycle—Watson Explorer 10.0.0," https://www-01.ibm.com/software/support/lifecycleapp/PLCDetail.wss?q45=T283072T66911H98, as printed Mar. 7, 2017 in 1 page.

IBM Analytics Communities, "Creating a map visualization for UK coordinates," https://community.watsonanalytics.com/discussions/questions/3753/creating-a-map-visualisation-for-uk-coordinates.html, as printed Mar. 9, 2017 in 1 page.

Esri News, "IBM and Esri Team Up to Offer Cognitive Analyrics and IoT in the IBM Cloud," http://www.esri.com/esri-news/releases/16-4qtr/ibm-and-esri-team-up-to-offer-cognitive-analytics-and-iot-in-the-ibm-cloud, as published on Oct. 26, 2016, in 2 pages.

Notice of Allowance for U.S. Appl. No. 15/398,113 dated Jun. 30, 2017.

Official Communication for Europaean Patent Application No. 15202919.5, dated Jun. 12, 2017.

Official Communication for U.S. Appl. No. 15/398,113 dated Feb. 17, 2017.

Gill et al "Computerised Linking of Medical Records: Methodological Guidelines," Journal of Epidemiology and Community Health, 1993, vol. 47, pp. 316-319.

Wikipedia, "Mobile Web," Jan. 23, 2015, retrieved from the internet on Mar. 15, 2016 https://en.wikipedia.org/w/index.php?title=Mobile_Web&oldid=643800164.

Winkler, William E., "Bureau of the Census Statistical Research Division Record Linkage Software and Methods for Merging Administrative Lists," Statistical Research Report Series No. RR2001/03, Jul. 23, 2001, https://www.census.gov/srd/papers/pdf/rr2001-03.pdf, retrieved on Mar. 9, 2016.

Notice of Allowance for U.S. Appl. No. 14/483,527 dated Apr. 29, 2016.

Official Communication for European Patent Application No. 14200298.9 dated May 13, 2015.

Official Communication for European Patent Application No. 15200073.3 dated Mar. 30, 2016.

Official Communication for European Patent Application No. 15201924.6 dated Apr. 25, 2016.

Official Communication for European Patent Application No. 16152984.7 dated Mar. 24, 2016.

Official Communication for U.S. Appl. No. 14/141,252 dated Apr. 14, 2016.

Official Communication for U.S. Appl. No. 14/225,160 dated Jun. 16, 2016.

Official Communication for U.S. Appl. No. 14/225,160 dated Apr. 22, 2016.

Official Communication for U.S. Appl. No. 14/929,584 dated May 25, 2016.

"A First Look: Predicting Market Demand for Food Retail using a Huff Analysis," TRF Policy Solutions, Jul. 2012, pp. 30.

"A Quick Guide to UniProtKB Swiss-Prot & TrEMBL," Sep. 2011, pp. 2.

"A Word About Banks and the Laundering of Drug Money," Aug. 18, 2012, http://www.golemxiv.co.uk/2012/08/a-word-about-banks-and-the-laundering-of-drug-money/.

About 80 Minutes, "Palantir in a Number of Parts—Part 6—Graph," Mar. 21, 2013, pp. 1-6.

Acklen, Laura, "Absolute Beginner's Guide to Microsoft Word 2003," Dec. 24, 2003, pp. 15-18, 34-41, 308-316.

Alur et al., "Chapter 2: IBM InfoSphere DataStage Stages," IBM InfoSphere DataStage Data Flow and Job Design, Jul. 1, 2008, pp. 35-137.

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

Ananiev et al., "The New Modality API," http://web.archive.org/web/20061211011958/http://java.sun.com/developer/technicalArticles/J2SE/Desktop/javase6/modality/, Jan. 21, 2006, pp. 8.

Bluttman et al., "Excel Formulas and Functions for Dummies," 2005, Wiley Publishing, Inc., pp. 280, 284-286.

Boyce, Jim, "Microsoft Outlook 2010 Inside Out," Aug. 1, 2010, retrieved from the internet https://capdtron.files.wordpress.com/2013/01/outlook-2010-inside_out.pdf.

Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.

Canese et al., "Chapter 2: PubMed: The Bibliographic Database," The NCBI Handbook, Oct. 2002, pp. 1-10.

(56) References Cited

OTHER PUBLICATIONS

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.

Conner, Nancy, "Google Apps: The Missing Manual," May 1, 2008, pp. 15.

Definition "Identify" downloaded Jan. 22, 2015, 1 page.

Definition "Overlay" downloaded Jan. 22, 2015, 1 page.

Delcher et al., "Identifying Bacterial Genes and Endosymbiont DNA with Glimmer," BioInformatics, vol. 23, No. 6, 2007, pp. 673-679.

Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.

Gesher, Ari, "Palantir Screenshots in the Wild: Swing Sightings," The Palantir Blog, Sep. 11, 2007, pp. 1-12.

GIS-NET 3 Public—Department of Regional Planning. Planning & Zoning Information for Unincorporated LA County. Retrieved Oct. 2, 2013 from http://gls.planning.lacounty.gov/GIS-NET3_Public/Viewer.html.

Goswami, Gautam, "Quite Writly Said!," One Brick at a Time, Aug. 21, 2005, pp. 7.

Griffith, Daniel A., "A Generalized Huff Model," Geographical Analysis, Apr. 1982, vol. 14, No. 2, pp. 135-144.

Hansen et al. "Analyzing Social Media Networks with NodeXL: Insights from a Connected World", Chapter 4, pp. 53-67 and Chapter 10, pp. 143-164, published Sep. 2010.

Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.

Hibbert et al., "Prediction of Shopping Behavior Using a Huff Model Within a GIS Framework," Healthy Eating in Context, Mar. 18, 2011, pp. 16.

Hogue et al., "Thresher: Automating the Unwrapping of Semantic Content from the World Wide Web," 14th International Conference on World Wide Web, WWW 2005: Chiba, Japan, May 10-14, 2005, pp. 86-95.

Huang et al., "Systematic and Integrative Analysis of Large Gene Lists Using DAVID Bioinformatics Resources," Nature Protocols, 4.1, 2009, 44-57.

Huff et al., "Calibrating the Huff Model Using ArcGIS Business Analyst," ESRI, Sep. 2008, pp. 33.

Huff, David L., "Parameter Estimation in the Huff Model," ESRI, ArcUser, Oct.-Dec. 2003, pp. 34-36.

Kahan et al., "Annotea: an open RDF infrastructure for shared WEB annotations", Computer Networks 39, pp. 589-608, 2002.

Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.

Keylines.com, "KeyLines Datasheet," Mar. 2014, http://keylines.com/wp-content/uploads/2014/03/KeyLines-datasheet.pdf downloaded May 12, 2014 in 2 pages.

Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.

Kitts, Paul, "Chapter 14: Genome Assembly and Annotation Process," The NCBI Handbook, Oct. 2002, pp. 1-21.

Li et al., "Interactive Multimodal Visual Search on Mobile Device," IEEE Transactions on Multimedia, vol. 15, No. 3, Apr. 1, 2013, pp. 594-607.

Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.

Madden, Tom, "Chapter 16: The BLAST Sequence Analysis Tool," The NCBI Handbook, Oct. 2002, pp. 1-15.

Manno et al., "Introducing Collaboration in Single-user Applications through the Centralized Control Architecture," 2010, pp. 10.

Manske, "File Saving Dialogs," http://www.mozilla.org/editor/ui_specs/FileSaveDialogs.html, Jan. 20, 1999, pp. 7.

Map of San Jose, CA. Retrieved Oct. 2, 2013 from http://maps.yahoo.com.

Map of San Jose, CA. Retrieved Oct. 2, 2013 from http://maps.bing.com.

Map of San Jose, CA. Retrieved Oct. 2, 2013 from http://maps.google.com.

Microsoft—Developer Network, "Getting Started with VBA in Word 2010," Apr. 2010, http://msdn.microsoft.com/en-us/library/ff604039%28v=office.14%29.aspx as printed Apr. 4, 2014 in 17 pages.

Microsoft Office—Visio, "About connecting shapes," http://office.microsoft.com/en-us/visio-help/about-connecting-shapes-HP085050369.aspx printed Aug. 4, 2011 in 6 pages.

Microsoft Office—Visio, "Add and glue connectors with the Connector tool," http://office.microsoft.com/en-us/visio-help/add-and-glue-connectors-with-the-connector-tool-HA010048532.aspx?CTT=1 printed Aug. 4, 2011 in 1 page.

Mizrachi, Ilene, "Chapter 1: GenBank: The Nuckeotide Sequence Database," The NCBI Handbook, Oct. 2002, pp. 1-14.

"Money Laundering Risks and E-Gaming: A European Overview and Assessment," 2009, http://www.cf.ac.uk/socsi/resources/Levi_Final_Money_Laundering_Risks_egaming.pdf.

Nierman, "Evaluating Structural Similarity in XML Documents," 2002, 6 pages.

Nolan et al., "MCARTA: A Malicious Code Automated Run-Time Analysis Framework," Homeland Security, 2012 IEEE Conference on Technologies for, Nov. 13, 2012, pp. 13-17.

Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.

Palantir Technologies, "Palantir Labs—Timeline," Oct. 1, 2010, retrieved from the internet https://www.youtube.com/watch?v=JCgDW5bru9M.

Palmas et al., "An Edge-Bunding Layout for Interactive Parallel Coordinates" 2014 IEEE Pacific Visualization Symposium, pp. 57-64.

Perdisci et al., "Behavioral Clustering of HTTP-Based Malware and Signature Generation Using Malicious Network Traces," USENIX, Mar. 18, 2010, pp. 1-14.

"Potential Money Laundering Warning Signs," snapshot taken 2003, https://web.archive.org/web/20030816090055/http:/linsolinc.com/ANTI-MONEY%20LAUNDERING%20TRAINING%20GUIDES.pdf.

Quest, "Toad for Oracle 11.6—Guide to Using Toad," Sep. 24, 2012, pp. 1-162.

"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.

Rouse, Margaret, "OLAP Cube," http://searchdatamanagement.techtarget.com/definition/OLAP-cube, Apr. 28, 2012, pp. 16.

Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.

(56) References Cited

OTHER PUBLICATIONS

Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
Symantec Corporation, "E-Security Begins with Sound Security Policies," Announcement Symantec, Jun. 14, 2001.
"The FASTA Program Package," fasta-36.3.4, Mar. 25, 2011, pp. 29.
Thompson, Mick, "Getting Started with GEO," Getting Started with GEO, Jul. 26, 2011.
Umagandhi et al., "Search Query Recommendations Using Hybrid User Profile with Query Logs," International Journal of Computer Applications, vol. 80, No. 10, Oct. 1, 2013, pp. 7-18.
"Using Whois Based Geolocation and Google Maps API for Support Cybercrime Investigations," http://wseas.us/e-library/conferences/2013/Dubrovnik/TELECIRC/TELECIRC-32.pdf.
Wikipedia, "Federated Database System," Sep. 7, 2013, retrieved from the internet on Jan. 27, 2015 http://en.wikipedia.org/w/index.php?title=Federated_database_system&oldid=571954221.
Wright et al., "Palantir Technologies VAST 2010 Challenge Text Records—Investigations into Arms Dealing," Oct. 29, 2010, pp. 1-10.
Yang et al., "HTML Page Analysis Based on Visual Cues," 2001, pp. 859-864.
Notice of Acceptance for Australian Patent Application No. 2014250678 dated Oct. 7, 2015.
Notice of Allowance for U.S. Appl. No. 12/556,318 dated Nov. 2, 2015.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/148,568 dated Aug. 26, 2015.
Notice of Allowance for U.S. Appl. No. 14/192,767 dated Dec. 16, 2014.
Notice of Allowance for U.S. Appl. No. 14/225,084 dated May 4, 2015.
Notice of Allowance for U.S. Appl. No. 14/268,964 dated Dec. 3, 2014.
Notice of Allowance for U.S. Appl. No. 14/294,098 dated Dec. 29, 2014.
Notice of Allowance for U.S. Appl. No. 14/326,738 dated Nov. 18, 2015.
Notice of Allowance for U.S. Appl. No. 14/473,552 dated Jul. 24, 2015.
Notice of Allowance for U.S. Appl. No. 14/473,860 dated Jan. 5, 2015.
Notice of Allowance for U.S. Appl. No. 14/486,991 dated May 1, 2015.
Notice of Allowance for U.S. Appl. No. 14/504,103 dated May 18, 2015.
Notice of Allowance for U.S. Appl. No. 14/616,080 dated Apr. 2, 2015.
Official Communication for Australian Patent Application No. 2014201511 dated Feb. 27, 2015.
Official Communication for Australian Patent Application No. 2014202442 dated Mar. 19, 2015.
Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014213553 dated May 7, 2015.
Official Communication for Australian Patent Application No. 2014250678 dated Jun. 17, 2015.
Official Communication for European Patent Application No. 14158861.6 dated Jun. 16, 2014.
Official Communication for European Patent Application No. 14159464.8 dated Jul. 31, 2014.
Official Communication for European Patent Application No. 14180142.3 dated Feb. 6, 2015.
Official Communication for European Patent Application No. 14180281.9 dated Jan. 26, 2015.
Official Communication for European Patent Application No. 14180321.3 dated Apr. 17, 2015.
Official Communication for European Patent Application No. 14180432.8 dated Jun. 23, 2015.
Official Communication for European Patent Application No. 14186225.0 dated Feb. 13, 2015.
Official Communication for European Patent Application No. 14187739.9 dated Jul. 6, 2015.
Official Communication for European Patent Application No. 14187996.5 dated Feb. 12, 2015.
Official Communication for European Patent Application No. 14189344.6 dated Feb. 20, 2015.
Official Communication for European Patent Application No. 14189347.9 dated Mar. 4, 2015.
Official Communication for European Patent Application No. 14189802.3 dated May 11, 2015.
Official Communication for European Patent Application No. 14191540.5 dated May 27, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14197938.5 dated Apr. 28, 2015.
Official Communication for European Patent Application No. 14199182.8 dated Mar. 13, 2015.
Official Communication for European Patent Application No. 15155845.9 dated Oct. 6, 2015.
Official Communication for European Patent Application No. 15155846.7 dated Jul. 8, 2015.
Official Communication for European Patent Application No. 15165244.3 dated Aug. 27, 2015.
Official Communication for European Patent Application No. 15175106.2 dated Nov. 5, 2015.
Official Communication for European Patent Application No. 15175151.8 dated Nov. 25, 2015.
Official Communication for European Patent Application No. 15183721.8 dated Nov. 23, 2015.
Official Communication for Great Britain Patent Application No. 1404457.2 dated Aug. 14, 2014.
Official Communication for Great Britain Patent Application No. 1404574.4 dated Dec. 18, 2014.
Official Communication for Great Britain Patent Application No. 1408025.3 dated Nov. 6, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for Netherlands Patent Application No. 2012437 dated Sep. 18, 2015.
Official Communication for Netherlands Patent Application No. 2013306 dated Apr. 24, 2015.
Official Communication for New Zealand Patent Application No. 622513 dated Apr. 3, 2014.
Official Communication for New Zealand Patent Application No. 622517 dated Apr. 3, 2014.
Official Communication for New Zealand Patent Application No. 624557 dated May 14, 2014.
Official Communication for New Zealand Patent Application No. 627962 dated Aug. 5, 2014.
Official Communication for New Zealand Patent Application No. 628161 dated Aug. 25, 2014.
Official Communication for New Zealand Patent Application No. 628263 dated Aug. 12, 2014.

(56) References Cited

OTHER PUBLICATIONS

Official Communication for New Zealand Patent Application No. 628495 dated Aug. 19, 2014.
Official Communication for New Zealand Patent Application No. 628585 dated Aug. 26, 2014.
Official Communication for New Zealand Patent Application No. 628840 dated Aug. 28, 2014.
Official Communication for U.S. Appl. No. 12/556,318 dated Jul. 2, 2015.
Official Communication for U.S. Appl. No. 13/247,987 dated Apr. 2, 2015.
Official Communication for U.S. Appl. No. 13/247,987 dated Sep. 22, 2015.
Official Communication for U.S. Appl. No. 13/831,791 dated Mar. 4, 2015.
Official Communication for U.S. Appl. No. 13/831,791 dated Aug. 6, 2015.
Official Communication for U.S. Appl. No. 13/835,688 dated Jun. 17, 2015.
Official Communication for U.S. Appl. No. 13/839,026 dated Aug. 4, 2015.
Official Communication for U.S. Appl. No. 14/134,558 dated Oct. 7, 2015.
Official Communication for U.S. Appl. No. 14/148,568 dated Oct. 22, 2014.
Official Communication for U.S. Appl. No. 14/148,568 dated Mar. 26, 2015.
Official Communication for U.S. Appl. No. 14/196,814 dated May 5, 2015.
Official Communication for U.S. Appl. No. 14/225,006 dated Sep. 10, 2014.
Official Communication for U.S. Appl. No. 14/225,006 dated Sep. 2, 2015.
Official Communication for U.S. Appl. No. 14/225,006 dated Feb. 27, 2015.
Official Communication for U.S. Appl. No. 14/225,084 dated Sep. 11, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated May 20, 2015.
Official Communication for U.S. Appl. No. 14/225,160 dated Oct. 22, 2014.
Official Communication for U.S. Appl. No. 14/225,160 dated Jul. 29, 2014.
Official Communication for U.S. Appl. No. 14/268,964 dated Sep. 3, 2014.
Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,596 dated Apr. 30, 2015.
Official Communication for U.S. Appl. No. 14/289,599 dated Jul. 22, 2014.
Official Communication for U.S. Appl. No. 14/289,599 dated May 29, 2015.
Official Communication for U.S. Appl. No. 14/289,599 dated Sep. 4, 2015.
Official Communication for U.S. Appl. No. 14/294,098 dated Aug. 15, 2014.
Official Communication for U.S. Appl. No. 14/294,098 dated Nov. 6, 2014.
Official Communication for U.S. Appl. No. 14/306,138 dated Sep. 14, 2015.
Official Communication for U.S. Appl. No. 14/306,138 dated Feb. 18, 2015.
Official Communication for U.S. Appl. No. 14/306,138 dated Sep. 23, 2014.
Official Communication for U.S. Appl. No. 14/306,138 dated Dec. 24, 2015.
Official Communication for U.S. Appl. No. 14/306,138 dated May 26, 2015.
Official Communication for U.S. Appl. No. 14/306,138 dated Dec. 3, 2015.
Official Communication for U.S. Appl. No. 14/306,147 dated Feb. 19, 2015.
Official Communication for U.S. Appl. No. 14/306,147 dated Aug. 7, 2015.
Official Communication for U.S. Appl. No. 14/306,147 dated Sep. 9, 2014.
Official Communication for U.S. Appl. No. 14/306,154 dated Mar. 11, 2015.
Official Communication for U.S. Appl. No. 14/306,154 dated May 15, 2015.
Official Communication for U.S. Appl. No. 14/306,154 dated Nov. 16, 2015.
Official Communication for U.S. Appl. No. 14/306,154 dated Jul. 6, 2015.
Official Communication for U.S. Appl. No. 14/306,154 dated Sep. 9, 2014.
Official Communication for U.S. Appl. No. 14/319,765 dated Sep. 10, 2015.
Official Communication for U.S. Appl. No. 14/319,765 dated Jun. 16, 2015.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/323,935 dated Jun. 22, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Jul. 31, 2015.
Official Communication for U.S. Appl. No. 14/326,738 dated Mar. 31, 2015.
Official Communication for U.S. Appl. No. 14/473,552 dated Feb. 24, 2015.
Official Communication for U.S. Appl. No. 14/486,991 dated Mar. 10, 2015.
Official Communication for U.S. Appl. No. 14/490,612 dated Aug. 18, 2015.
Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/579,752 dated Aug. 19, 2015.
Official Communication for U.S. Appl. No. 14/579,752 dated May 26, 2015.
Official Communication for U.S. Appl. No. 14/631,633 dated Sep. 10, 2015.
Official Communication for U.S. Appl. No. 14/639,606 dated Oct. 16, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/726,353 dated Sep. 10, 2015.

(56) References Cited

OTHER PUBLICATIONS

Official Communication for U.S. Appl. No. 14/813,749 dated Sep. 28, 2015.
Restriction Requirement for U.S. Appl. No. 13/839,026 dated Apr. 2, 2015.
Appacts, "Smart Thinking for Super Apps," http://www.appacts.com Printed Jul. 18, 2013 in 4 pages.
Apsalar, "Data Powered Mobile Advertising," "Free Mobile App Analytics" and various analytics related screen shots http://apsalar.com Printed Jul. 18, 2013 in 8 pages.
Capptain—Pilot Your Apps, http://www.capptain.com Printed Jul. 18, 2013 in 6 pages.
Chaudhuri et al., "An Overview of Business Intelligence Technology," Communications of the ACM, Aug. 2011, vol. 54, No. 8.
Cohn et al., "Semi-supervised Clustering with User Feedback," Constrained Clustering: Advances in Algorithms, Theory, and Applications 4.1, 2003, pp. 17-32.
Countly Mobile Analytics, http://count.ly/ Printed Jul. 18, 2013 in 9 pages.
DISTIMO—App Analytics, http://www distimo.com/app-analytics Printed Jul. 18, 2013 in 5 pages.
Flurry Analytics, http://www.flurry.com/ Printed Jul. 18, 2013 in 14 pages.
Glaab et al., "EnrichNet: Network-Based Gene Set Enrichment Analysis," Bioinformatics 28.18 (2012): pp. i451-i457.
Google Analytics Official Website—Web Analytics & Reporting, http://www.google.com/analytics.index.html Printed Jul. 18, 2013 in 22 pages.
Gorr et al., "Crime Hot Spot Forecasting: Modeling and Comparative Evaluation," Grant 98-IJ-CX-K005, May 6, 2002, 37 pages.
Gu et al., "Record Linkage: Current Practice and Future Directions," Jan. 15, 2004, pp. 32.
Hua et al., "A Multi-attribute Data Structure with Parallel Bloom Filters for Network Services" HiPC 2006, LNCS 4297, pp. 277-288, 2006.
"HunchLab: Heat Map and Kernel Density Calculation for Crime Analysis," Azavea Journal, printed from www.azavea.com/blogs/newsletter/v4l4/kernel-density-capabilities-added-to-hunchlab/ on Sep. 9, 2014, 2 pages.
Hur et al., "SciMiner: web-based literature mining tool for target identification and functional enrichment analysis," Bioinformatics 25.6 (2009): pp. 838-840.
IBM, Determining Business Object Structure, IBM, 2004, pp. 9.
Kontagent Mobile Analytics, http://www.kontagent.com/ Printed Jul. 18, 2013 in 9 pages.
Localytics—Mobile App Marketing & Analytics, http://www.localytics.com/ Printed Jul. 18, 2013 in 12 pages.
Mixpanel—Mobile Analytics, https://mixpanel.com/ Printed Jul. 18, 2013 in 13 pages.
Open Web Analytics (OWA), http://www.openwebanalytics.com/ Printed Jul. 19, 2013 in 5 pages.
Piwik—Free Web Analytics Software. http://piwik.org/ Printed Jul. 19, 2013 in18 pages.
"SAP Business Objects Explorer Online Help", SAP Business Objects, Mar. 19, 2012, pp. 68.
StatCounter—Free Invisible Web Tracker, Hit Counter and Web Stats, http://statcounter.com/ Printed Jul. 19, 2013 in 17 pages.
TestFlight—Beta Testing on the Fly, http://testflightapp.com/ Printed Jul. 18, 2013 in 3 pages.
trak.io, http://trak.io/ printed Jul. 18, 2013 in 3 pages.
UserMetrix, http://usermetrix.com/android-analytics printed Jul. 18, 2013 in 3 pages.
Valentini et al., "Ensembles of Learning Machines," M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 2 Parts].
Wang et al., "Research on a Clustering Data De-Duplication Mechanism Based on Bloom Filter," IEEE 2010, 5 pages.
Wikipedia, "Multimap," Jan. 1, 2013, https://en.wikipedia.org/w/index.php?title=Multimap&oldid=530800748.
Zheng et al., "GOEAST: a web-based software toolkit for Gene Ontology enrichment analysis," Nucleic acids research 36.suppl 2 (2008): pp. W385-W363.
Notice of Allowance for U.S. Appl. No. 13/247,987 dated Mar. 17, 2016.
Notice of Allowance for U.S. Appl. No. 14/192,767 dated Apr. 20, 2015.
Notice of Allowance for U.S. Appl. No. 14/319,161 dated May 4, 2015.
Notice of Allowance for U.S. Appl. No. 14/323,935 dated Oct. 1, 2015.
Notice of Allowance for U.S. Appl. No. 14/451,221 dated Aug. 4, 2015.
Notice of Allowance for U.S. Appl. No. 14/473,860 dated Feb. 27, 2015.
Notice of Allowance for U.S. Appl. No. 14/479,863 dated Mar. 31, 2015.
Notice of Allowance for U.S. Appl. No. 14/552,336 dated Nov. 3, 2015.
Notice of Allowance for U.S. Appl. No. 14/579,752 dated Apr. 4, 2016.
Notice of Allowance for U.S. Appl. No. 14/676,621 dated Feb. 10, 2016.
Notice of Allowance for U.S. Appl. No. 14/746,671 dated Jan. 21, 2016.
Notice of Allowance for U.S. Appl. No. 14/858,647 dated Mar. 4, 2016.
Official Communication for European Patent Application No. 14180321.3 dated May 9, 2016.
Official Communication for European Patent Application No. 14187996.5 dated Feb. 19, 2016.
Official Communication for European Patent Application No. 14189344.6 dated Feb. 29, 2016.
Official Communication for European Patent Application No. 14200246.8 dated May 29, 2015.
Official Communication for European Patent Application No. 15181419.1 dated Sep. 29, 2015.
Official Communication for European Patent Application No. 15184764.7 dated Dec. 14, 2015.
Official Communication for European Patent Application No. 15202919.5 dated May 9, 2016.
Official Communication for Great Britain Patent Application No. 1404486.1 dated May 21, 2015.
Official Communication for Great Britain Patent Application No. 1404486.1 dated Aug. 27, 2014.
Official Communication for Great Britain Patent Application No. 1404489.5 dated May 21, 2015.
Official Communication for Great Britain Patent Application No. 1404489.5 dated Aug. 27, 2014.
Official Communication for Great Britain Patent Application No. 1404499.4 dated Jun. 11, 2015.
Official Communication for Great Britain Patent Application No. 1404499.4 dated Aug. 20, 2014.
Official Communication for Great Britain Patent Application No. 1404499.4 dated Sep. 29, 2014.
Official Communication for Netherlands Patent Application 2012438 dated Sep. 21, 2015.
Official Communication for Netherlands Patents Application No. 2012417 dated Sep. 18, 2015.
Official Communication for Netherlands Patents Application No. 2012421 dated Sep. 18, 2015.
Official Communication for New Zealand Patent Application No. 622473 dated Jun. 19, 2014.
Official Communication for New Zealand Patent Application No. 622473 dated Mar. 27, 2014.
Official Communication for U.S. Appl. No. 13/827,491 dated Dec. 1, 2014.
Official Communication for U.S. Appl. No. 13/827,491 dated Jun. 22, 2015.
Official Communication for U.S. Appl. No. 13/827,491 dated Mar. 30, 2016.

(56) References Cited

OTHER PUBLICATIONS

Official Communication for U.S. Appl. No. 13/827,491 dated Oct. 9, 2015.
Official Communication for U.S. Appl. No. 13/831,791 dated Feb. 11, 2016.
Official Communication for U.S. Appl. No. 13/835,688 dated Sep. 30, 2015.
Official Communication for U.S. Appl. No. 14/102,394 dated Mar. 27, 2014.
Official Communication for U.S. Appl. No. 14/108,187 dated Apr. 17, 2014.
Official Communication for U.S. Appl. No. 14/108,187 dated Mar. 20, 2014.
Official Communication for U.S. Appl. No. 14/135,289 dated Apr. 16, 2014.
Official Communication for U.S. Appl. No. 14/135,289 dated Jul. 7, 2014.
Official Communication for U.S. Appl. No. 14/141,252 dated Oct. 8, 2015.
Official Communication for U.S. Appl. No. 14/148,568 dated Mar. 27, 2014.
Official Communication for U.S. Appl. No. 14/192,767 dated Sep. 24, 2014.
Official Communication for U.S. Appl. No. 14/192,767 dated May 6, 2014.
Official Communication for U.S. Appl. No. 14/196,814 dated Aug. 13, 2014.
Official Communication for U.S. Appl. No. 14/196,814 dated Oct. 7, 2015.
Official Communication for U.S. Appl. No. 14/225,006 dated Dec. 21, 2015.
Official Communication for U.S. Appl. No. 14/225,084 dated Feb. 26, 2016.
Official Communication for U.S. Appl. No. 14/225,084 dated Jan. 4, 2016.
Official Communication for U.S. Appl. No. 14/225,160 dated Jan. 25, 2016.
Official Communication for U.S. Appl. No. 14/268,964 dated Jul. 11, 2014.
Official Communication for U.S. Appl. No. 14/289,596 dated Aug. 5, 2015.
Official Communication for U.S. Appl. No. 14/306,138 dated Mar. 17, 2016.
Official Communication for U.S. Appl. No. 14/306,147 dated Dec. 24, 2015.
Official Communication for U.S. Appl. No. 14/306,154 dated Feb. 1, 2016.
Official Communication for U.S. Appl. No. 14/306,154 dated Mar. 17, 2016.
Official Communication for U.S. Appl. No. 14/319,161 dated Jan. 23, 2015.
Official Communication for U.S. Appl. No. 14/319,765 dated Feb. 1, 2016.
Official Communication for U.S. Appl. No. 14/451,221 dated Oct. 21, 2014.
Official Communication for U.S. Appl. No. 14/451,221 dated Apr. 6, 2015.
Official Communication for U.S. Appl. No. 14/463,615 dated Sep. 10, 2015.
Official Communication for U.S. Appl. No. 14/463,615 dated Nov. 13, 2014.
Official Communication for U.S. Appl. No. 14/463,615 dated May 21, 2015.
Official Communication for U.S. Appl. No. 14/463,615 dated Jan. 28, 2015.
Official Communication for U.S. Appl. No. 14/463,615 dated Dec. 9, 2015.
Official Communication for U.S. Appl. No. 14/473,860 dated Nov. 4, 2014.
Official Communication for U.S. Appl. No. 14/479,863 dated Dec. 26, 2014.
Official Communication for U.S. Appl. No. 14/483,527 dated Jun. 22, 2015.
Official Communication for U.S. Appl. No. 14/483,527 dated Jan. 28, 2015.
Official Communication for U.S. Appl. No. 14/483,527 dated Oct. 28, 2015.
Official Communication for U.S. Appl. No. 14/490,612 dated Jan. 27, 2015.
Official Communication for U.S. Appl. No. 14/490,612 dated Mar. 31, 2015.
Official Communication for U.S. Appl. No. 14/552,336 dated Jul. 20, 2015.
Official Communication for U.S. Appl. No. 14/562,524 dated Nov. 10, 2015.
Official Communication for U.S. Appl. No. 14/562,524 dated Sep. 14, 2015.
Official Communication for U.S. Appl. No. 14/562,524 dated Feb. 18, 2016.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/571,098 dated Feb. 23, 2016.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/579,752 dated Dec. 9, 2015.
Official Communication for U.S. Appl. No. 14/631,633 dated Feb. 3, 2016.
Official Communication for U.S. Appl. No. 14/639,606 dated Apr. 5, 2016.
Official Communication for U.S. Appl. No. 14/676,621 dated Oct. 29, 2015.
Official Communication for U.S. Appl. No. 14/676,621 dated Jul. 30, 2015.
Official Communication for U.S. Appl. No. 14/726,353 dated Mar. 1, 2016.
Official Communication for U.S. Appl. No. 14/746,671 dated Nov. 12, 2015.
Official Communication for U.S. Appl. No. 14/746,671 dated Sep. 28, 2015.
Official Communication for U.S. Appl. No. 14/800,447 dated Dec. 10, 2015.
Official Communication for U.S. Appl. No. 14/800,447 dated Mar. 3, 2016.
Official Communication for U.S. Appl. No. 14/813,749 dated Apr. 8, 2016.
Official Communication for U.S. Appl. No. 14/842,734 dated Nov. 19, 2015.
Official Communication for U.S. Appl. No. 14/929,584 dated Feb. 4, 2016.

* cited by examiner

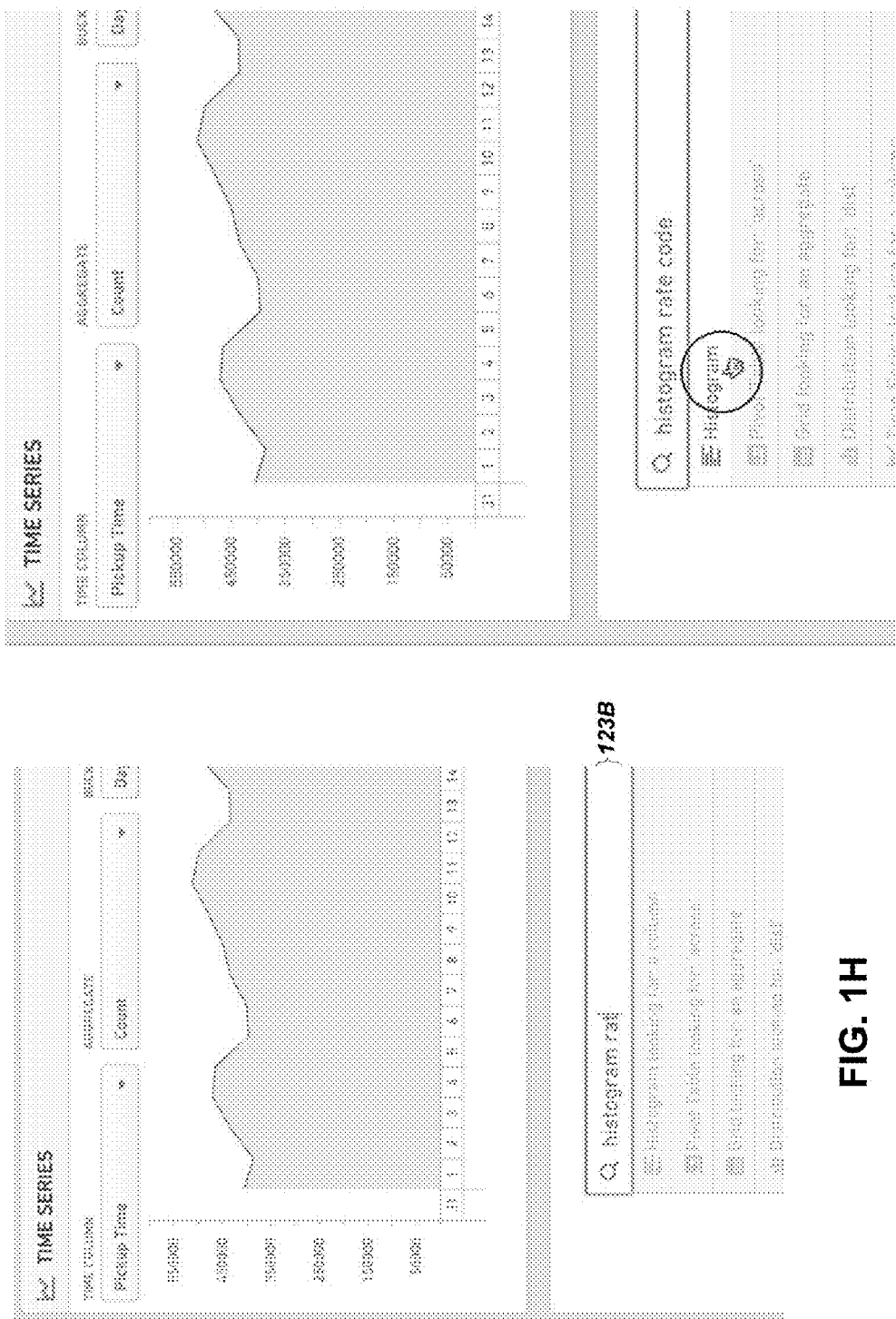

INTERACTIVE USER INTERFACE FOR DYNAMIC DATA ANALYSIS EXPLORATION AND QUERY PROCESSING

CROSS-REFERENCE TO RELATED APPLICATIONS

This application is a continuation of U.S. patent application Ser. No. 14/858,647, filed on Sep. 18, 2015, which claims priority from provisional U.S. Pat. App. No. 62/097,327, filed on Dec. 29, 2014. Each of the above-referenced applications is hereby incorporated by reference in its entirety.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Exploration, mining, and analysis of high-volume data sources and data warehouses can be a time and resource intensive process, both for the user and for the underlying computing systems which provide data analysis features. Large volumes of data contribute to high consumption of computer memory, and processing of such large volumes of data can require extremely powerful computer processors and processing time. Users such as data analysts often face a seemingly insurmountable task of attempting to locate discrete pieces of information from data sources which can include or primarily consist of innocuous or noisy data which provides little probative value. Often, many iterations to explore such data are required, with each iteration having an associated cost in time and resources.

BRIEF DESCRIPTION OF THE DRAWINGS

FIGS. 1A-1M illustrate an example data analysis workflow performed using several interactive data analysis user interfaces, as generated using one embodiment of the data analysis system of FIG. 6.

DETAILED DESCRIPTION

Overview

Figure 1A:
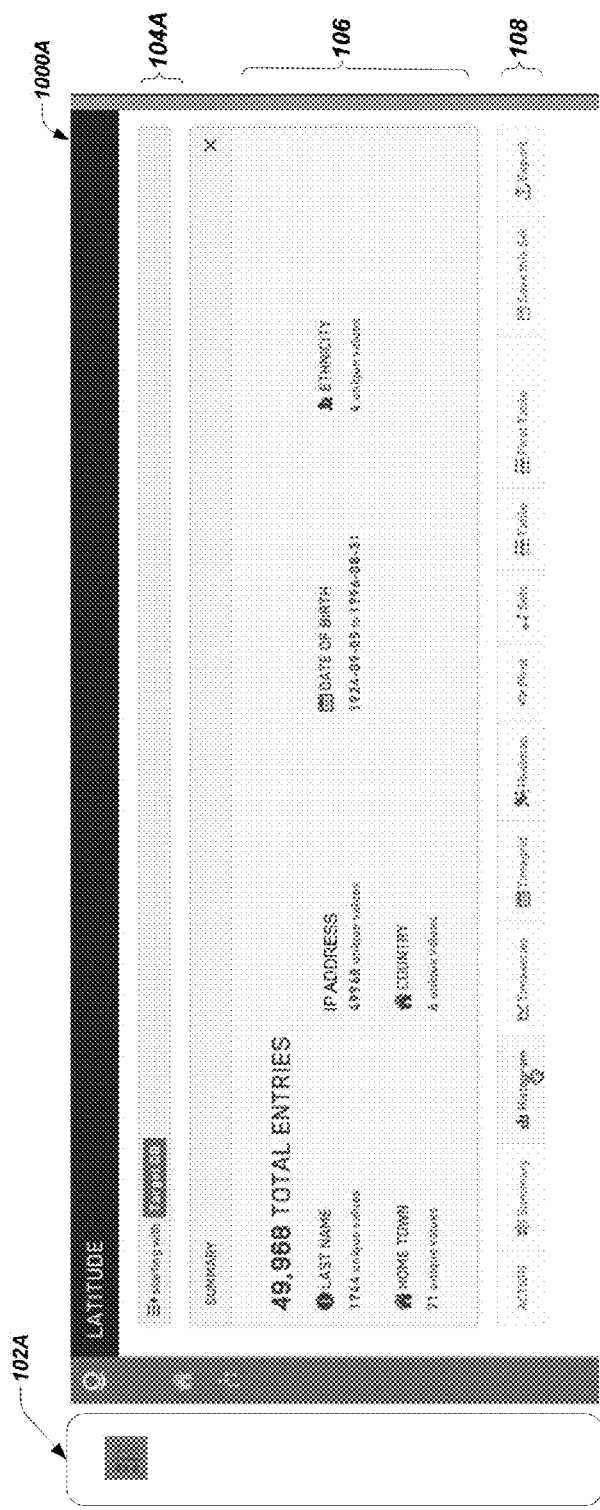

Data analysts face a daunting challenge when tasked with exploring a large volume of data to identify discrete pieces of information and intelligence—a veritable needle-in-a-haystack problem. In some cases a data analyst may have a lead on something she wishes to investigate. For example, knowing that a particular bad actor was involved in an incident may be a starting point from which the data analyst can begin to investigate other individuals who may have been involved. However, in many cases the data analyst has little information or, at best, only some contextual information on which to base an investigation. For example, the data analyst might know that a website was hacked at a certain time but have little else to go on to identify the individuals involved. However, data analysts might need to explore multiple analysis paths, many of which lead to "dead ends" or results that do not answer the search premise, by sorting and filtering through a massive volume of (for example) Internet proxy traffic data, cyber security data, telephone data, and/or any other type of data. The data analyst's path through the data is often multi-directional, in that the analyst may approach a problem from the top-down, bottom-up, and/or in either direction over the course of a given data analysis path and investigation. For example, the data analyst may begin with a large set of data, submit one or more queries which may lead to smaller sets of data results or filtered data results, and then merge or join smaller sets of data results to formulate larger sets of data, exclude subsets of data, and so on in as many iterations as the data analysts desires or finds useful.

The systems and methods described herein provide highly dynamic and interactive data analysis user interfaces which enable the data analyst to quickly and efficiently explore large volume data sources. In particular, a data analysis system, such as described herein, may provide features to enable the data analyst to investigate large volumes of data over many different paths of analysis while maintaining detailed and retraceable steps taken by the data analyst over the course of an investigation, as captured via the data analyst's queries and user interaction with the user interfaces provided by the data analysis system. For example, one data analysis path may begin with a high volume data set, such as Internet proxy data, which may include trillions of rows of data corresponding to Internet communication events even over a short period of time. The data analyst may pursue a data analysis path that involves applying a filter, joining to another table in a database, viewing a histogram, manipulating a pivot table, and finally viewing a summary of the entries located which match the parameters of the data analysis path. The summary may not provide the data analyst with the results she was hoping to find and thus she may decide to investigate another data analysis path. However, rather than start over from scratch, she may wish to return to another point in the first data analysis path. For example, perhaps while viewing the histogram she noted other points to explore later.

In an embodiment, a main data analysis workflow user interface provided by the data analysis system provides the data analyst with a set of highly interactive data visualization tools with which the data analyst can explore sets of data. Data visualization tools provided by the data analysis system can include, for example, a data summary view; a time series view; a time grid view; a heat map view; a pivot table view; an ability to link to another table in a database; and options to add, remove, or keep only selected results from a data view.

Each of these data visualization tools may include rich UI controls which are configured to respond to user interaction and input in a manner that allows the non-technical user to quickly and intuitively create complex data set queries. For example, in a histogram view data visualization UI, when a user selects (e.g., by clicking on, touching, speaking, etc.) a column in the histogram, a query filter may be automatically determined and applied to a subsequent query to be processed by the data analysis system. Or, in another example, an interactive heat map overlaid on a geographic region may allow the user to click and/or touch-and-drag to select a region of interest, and in response a query filter may be automatically generated which specifies the region of interest as a matching parameter. Subsequent queries may be easily built and executed to automatically apply the filter specified by the user interaction with the various data visualizations, providing a highly responsive, intuitive, and immersive user experience.

In one embodiment, the data analysis system maintains a session history for the analyst's data analysis paths and may provide various user interface features to allow the analyst to quickly and easily return to any prior point in the data analysis path, including the histogram view in the hypothetical example above. When a new data analysis path is started the session history is updated to include a new branch path from the original path.

As the analyst builds a data set query using these data visualization tools, the corresponding query result is added to the main data analysis workflow UI (for example, appended to the bottom of the workflow), and the session history is updated. This analysis interaction process may proceed over as many data set queries as the analyst wishes to investigate, with each subsequent query result added to the main data analysis workflow UI and the session history being updated.

In one embodiment, the main data analysis workflow UI provides the ability for the data analyst to scroll up or down within the current data analysis path, for example to re-display various data set query results and associated data visualizations appearing earlier in the current data analysis path (which, for example, may no longer fit in a displayable area of a display screen). The data analyst user may then decide to investigate a new data analysis path based on an earlier query result/visualization.

To assist the data analyst user in navigating these multiple data analysis paths, data query sets, and results, the data analysis system can provide a variety of path navigation user interface tools. For example, in one embodiment, an interactive breadcrumb path UI control may be generated and displayed (e.g., at the top of the main data analysis workflow UI, as shown in the example user interfaces herein; or in any position). Each "crumb" in the breadcrumb path UI control may indicate a summary of a respective data query and/or filter submitted over the course of the current data analysis path that is displayed in the main data analysis workflow UI. Further, each crumb may be selectable by the data analyst. Selecting a crumb may automatically update the main data analysis workflow UI to re-display the associated data set query and data visualization of the associated results.

In another embodiment, an interactive tree view UI control may be generated and displayed (e.g., at the right side of the main data analysis workflow UI, as shown in the example user interfaces herein; or in any position). Each "node" in the tree view path UI control may indicate a summary of the respective data queries submitted over the course of the current data analysis path that is displayed in the main data analysis workflow UI. For example, when a user positions a cursor or pointer over a node in the tree view, a popover UI element may appear next to the node, where the popover UI element includes a summary of the data query. Further, each node may be selectable by the data analyst. Selecting a node may automatically update the main data analysis workflow UI to re-display the associated data set query and data visualization of the associated results. The data analyst may then, for example, jump to another point, save the associated data set, or begin a new branched data analysis path.

The tree view UI control may be displayed in a variety of ways. In one embodiment, a single-path tree view UI control may be displayed corresponding to the current data analysis path. For example, suppose the current data analysis path (and the main data analysis workflow UI) includes a filter with a histogram view; a join with a table view; and a filter with a time series view. Then, the single-path tree view UI control may include one path comprising three nodes: filter-join-filter. In some embodiments the different associated data visualization elements may be indicated by representative icons, such the data analyst can view at-a-glance that the current analysis path comprises filter-join-filter.

In another embodiment, an all-paths tree view UI control may be displayed to present the user with all analysis paths explored for the current session. For example, suppose the current data analysis path is as described above with two additional branch paths: a heat map view branched from the join; and a time grid view branched from the first filter. Then, the all-paths tree view UI control may include five nodes corresponding to the three paths: filter-join-filter (the current path); filter-histogram; and filter-time grid. In one embodiment, the single-path tree view UI control may be displayed concurrently with the main data analysis workflow UI and display the current data analysis path. A user-selectable option to view the all-paths tree view UI control may be presented, and upon selection the all-paths tree view UI control may displayed such as in a popover UI element. The all-paths tree view UI control may be configured to support full user interaction in a similar manner to the single-path UI control. Thus, the data analyst may switch to the all-paths tree view UI control, select a node from the all-paths tree, and in response the main data analysis workflow UI will re-display the associated data set query and data visualization of the associated results.

The breadcrumb path UI control and the tree view path UI control can thus each be used to jump from any first point in the data analysis path to any second point in the data analysis path, with the main data analysis workflow UI being updated to match the selected point. However, in certain embodiments, when the user jumps from point to point in this manner, the associated data query may not need to be executed again. Rather, a cached copy of the previously generated data visualization may be re-displayed, or a cached copy of the associated data query results may be accessed and used to generate or update the data visualization.

The data analysis system described herein provides a variety of additional features and benefits. In certain embodiments, the data analysis system and provided user interfaces may enable the data analyst user to save data query set results at any stage in the analysis path; and/or export data query set results, for example to another database or another format such as a presentation software format (e.g., PowerPoint), as further described below.

Saving a data query set may allow the data analyst to return to an analysis path in progress at a later time for further exploration. In some instances the data query set may be saved such that the full analysis path taken to reach the particular data query set is saved as well, which can enable the analyst to re-explore the full path at a later time. In some cases, the data query set may be saved in a "clean" state, such that the analysis path taken to reach the particular data query set is not saved. This may be of benefit, for example, if the analysis path was particularly long or convoluted and saving the path provides little value to the analyst. The system may provide an option for the analyst to choose whether a data set should be saved with or without the full analysis path.

Several types or varieties of data sets may be saved in accordance with this feature. One example data set is a materialized saved set, which is a particular set of records that matches the exact set of records that an analyst currently observes, and can be retrievable in the same precise form at a later date. A materialized saved set may have different versions that are refreshable or updatable at a later date, and as such information can also be stored describing, among other things, how a refresh may be performed, when the last refresh was conducted, and who performed the refresh. Another example data set is a dynamic saved set, which is a workflow definition that will produce a set applying some saved criteria. Another example data set is a parameterized saved sets, which is a workflow definition that will produce a set applying some saved criteria against with sets of the same shape (e.g., column definitions) as the original saved definition input sets. Many other types of saved sets may be possible as well.

Exporting a data query set may allow the data analyst to extract a data query set, for example, for importing into another data source separate from the original, high-volume data source. This feature may be of particular benefit if, for example, the original, high-volume data source comprises data which is very noisy or may otherwise be of little value in more focused or specialized databases. Using the example above with reference to Internet proxy traffic data, the vast majority of such data is normal, everyday traffic which is likely not to be of particular interest. Rather than import the full set of Internet proxy data into a more specialized database, the data analyst can use the data analysis system herein to explore and filter down the high-volume data. Once a filtered data query set is obtained which appears to be of interest or relevance to the specialized database, the data set can be exported.

Another benefit to the export feature is that it may reduce the costs involved in maintaining and searching a high-volume data source by keeping that data source separate. For example, the cost (both financially and physical resource-wise in terms of memory, response time, processing speed, efficiency, power consumption, etc.) of maintenance, duplication, backups, and other redundancy measures for specialized databases can grow exponentially if copious amounts of noisy data are imported. Thus, using the data analysis system and export features herein, the specialized databases can remain specialized, while the high-volume data sources may still be explored to identify and extract valuable data.

The data analysis systems and methods described herein may also include various features for query optimization on the backend or server-side. For example, a query backend module may be configured to analyze user selections and interactions with the data set query results and associated data visualizations and, based on those selections and interactions, determine what data the user is actually interested in, and translate the query into an efficient or optimized search query string. For example, the user might produce a workflow or analysis path which involves linking or joining a first large data set to a second large data set, and then filtering the resulting linked data set. An optimized search query string may then be generated which applies the filter operation prior to the link or join operation, such that the resources required to perform the join operation would be greatly reduced (i.e., since the link or join operation would be performed on smaller data sets resulting from the filter being applied first).

Another query optimization feature which may be provided by the data analysis system includes logic to evaluate a query, such as a JOIN operation, will be and, based on the expense, determine whether a temp table should be created in order to improve the performance of subsequent queries using the data query result set. For example, in some cases a temp table may "cost" less in terms of computer processing or memory requirements than re-executing the JOIN operation. Another query optimization feature related to the use of such temp tables which may be provided by the data analysis system includes connection pooling, whereby temp tables may be mapped to different connections or users to facilitate efficient re-use of temp tables for the respective user's analysis workflow. These and other features described herein are of particular value in the context of processing and querying high-volume data, where physical hardware costs and resources are constrained.

In some embodiments, the data analysis system may be configured to defer execution of a query until a particular analytic view is rendered. This can provide additional efficiency, for example, when users are simply trying to construct complex set-based queries, and enables non-technical users to create complex queries without actually understanding the underlying query language (like SQL). Users might find benefit from the data analysis system as a tool that enables construction of complex reporting queries, even without visual feedback (but with the benefit of optionally including such visual feedback on demand). In some instances, the data analysis system may provide users with the ability to define filters without visual feedback, and do so incrementally and intuitively as a logical "next step" in a workflow for filtering, triaging, linking, and so on.

Example User Interfaces

Figure 6:
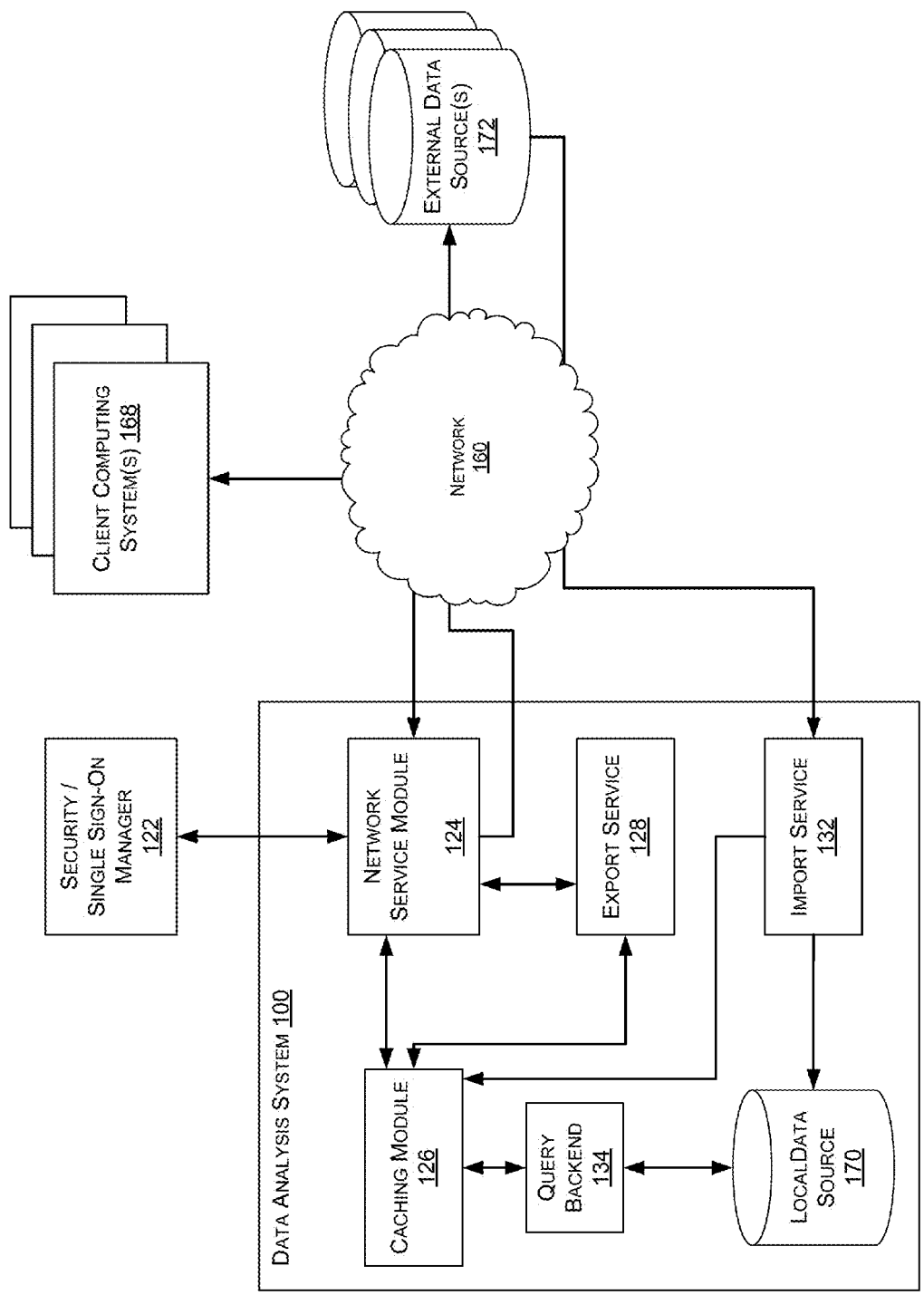
FIG. 6 is a block diagram of an implementation of an illustrative data analysis system.

FIGS. 1A-1D and 2A-2B illustrate example user interfaces and UI components, as used in one or more embodiments of the data analysis system 100 of FIG. 6. The sample user interfaces may be displayed, for example, via a web browser (e.g., as a web page), a mobile application, or a standalone application. In some embodiments, the sample user interfaces shown in FIGS. 1A-1D and 2A-2B may also be displayed on any suitable computer device, such as a cell/smart phone, tablet, wearable computing device, portable/mobile computing device, desktop, laptop, or personal computer, and are not limited to the samples as described herein. The user interfaces include examples of only certain features that a data analysis system may provide. In other embodiments, additional features may be provided, and they may be provided using various different user interfaces and software code. Depending on the embodiment, the user interfaces and functionality described with reference to FIGS. 1A-1D and 2A-2B may be provided by software executing on the individual's computing device, by a data analysis system located remotely that is in communication with the computing device via one or more networks, and/or some combination of software executing on the computing device and the data analysis system. In other embodiments, analogous interfaces may be presented using audio or other forms of communication. In an embodiment, the interfaces shown in FIGS. 1A-1D and 2A-2B are configured to be interactive and respond to various user interactions. Such user interactions may include clicks with a mouse, typing with a keyboard, touches and/or gestures on a touch screen, voice commands, physical gestures made within a proximity of a user interface, and/or the like.

FIG. 1A illustrates an example data analysis user interface 1000A, as generated using one embodiment of the data analysis system 100 of FIG. 6. The data analysis UI 1000 may comprise, for example, a main data analysis workflow user interface for a user, such as a data analyst, to dynamically build data sets and queries and to view query set results. The query set results may be generated by the data analysis system 100 in response to user queries, and presented via highly interactive user interface UI display elements and controls. The data analysis UI 1000 may include a tree view UI control 102A, breadcrumb UI control 104A, and a data visualization UI element 106, which in FIG. 1 comprises a summary data view presenting a summary of data set results. Also shown is an action menu 108 which provides a list of data analysis tools and options available for the user, including: summary view; histogram; time series; time grid; heat map; pivot table; a set viewer; a table view; a pivot table; and options to save a set and to export a set. Additional actions and options not shown can also be included. In response to selection of these various data analysis tools the data analysis UI 1000 may be updated to add a new UI display panel presenting the selected analysis tool at the bottom of the workflow area. The user may then use the selected analysis tool to build and run a subsequent query to obtain a next data query result set.

Each time a selected data analysis tool is used by the user to build a query, the data analysis system 100 may update the associated session history for the user to track the user's analysis path. In some embodiments, the session history may be updated as the user builds the query, but before the query is executed, in order to capture the user's work in progress. In some embodiments, the session history may be updated when the query is executed and query results are obtained. As the session history is updated, the tree view UI control 102A and the breadcrumb UI control 104A may also be updated to reflect the updated analysis path. This is described in more detail with reference to FIGS. 1B-1D as the example workflow progresses; as well as with respect to the process 400 of FIG. 4 herein. For example, the breadcrumb UI control 104A may be appended with a description of the query parameters and/or type of operation performed (e.g., as may be indicated by an icon). Similarly, the tree view UI control 102A may be updated to include an additional node on the current branch or path, corresponding to the additional analysis step (including either a query-in-progress or a query result set generated and added to the main workflow).

As the analysis path grows or the user begins to backtrack and create new branches, the tree view may become too large to persistently display in the main data analysis workflow user interface. Thus, in some embodiments, the tree view UI control 102A-D may comprise a single series of nodes representing the current analysis path in the session. The tree view UI control 102A-D may include an expand option which the user can select to view the full or expanded tree view. The full or expanded tree view may be presented as a popover UI control overlaid on the main data analysis workflow user interface or in a separate window or user interface. More detailed examples of the expanded tree view are illustrated and described with respect to FIGS. 2A and 2B herein.

With continued reference to FIG. 1A, the hand cursor over the histogram icon in the actions menu 108 indicates that the user is selecting a histogram data visualization, which is illustrated and described next in FIG. 1B.

Figure 1B:

FIG. 1B illustrates an example data analysis user interface 1000B, which may be a continuation of the workflow shown in user interface 1000A. Once the user has selected the histogram option, a histogram menu 110 may be displayed by which the user can select one or more query parameters specifying the desired output result and format. Other data visualization elements described herein may have similar or other menu options for the user to specify query parameters for the respective data visualization.

When the user is satisfied with the selection, e.g., of count_distinct, hometown, country, and quantity parameters in the example of FIG. 1B, the "compute" button may be selected. In response the data analysis system 100 receives the request and query parameters and processes a query against the current query result set. The output results may be used to generate the histogram data visualization and displayed in the main data analysis workflow user interface, as FIG. 1B shows. Also shown in user interface 1000B, the view UI control 102B may be updated to add an additional node indicating the histogram has been added to the current analysis path. In some embodiments, the visualization, e.g., the histogram, is updated in real time as the various parameters are each individually selected.

The histogram data visualization may be interactive and provide functionality for the analyst to quickly and intuitively begin developing another query. For example, in response to the user selecting one or more bars in the histogram, a query filter display 114B may appear and dynamically update to include each of the one or more bars selected by the user. When the user wishes to continue the analysis beyond the histogram, another action may be selected from the action menu 108B. If any query filter criteria are still selected from the user interaction with the histogram, these may be gathered and applied to the next query processed by the data analysis system for the current workflow.

Figure 1C:
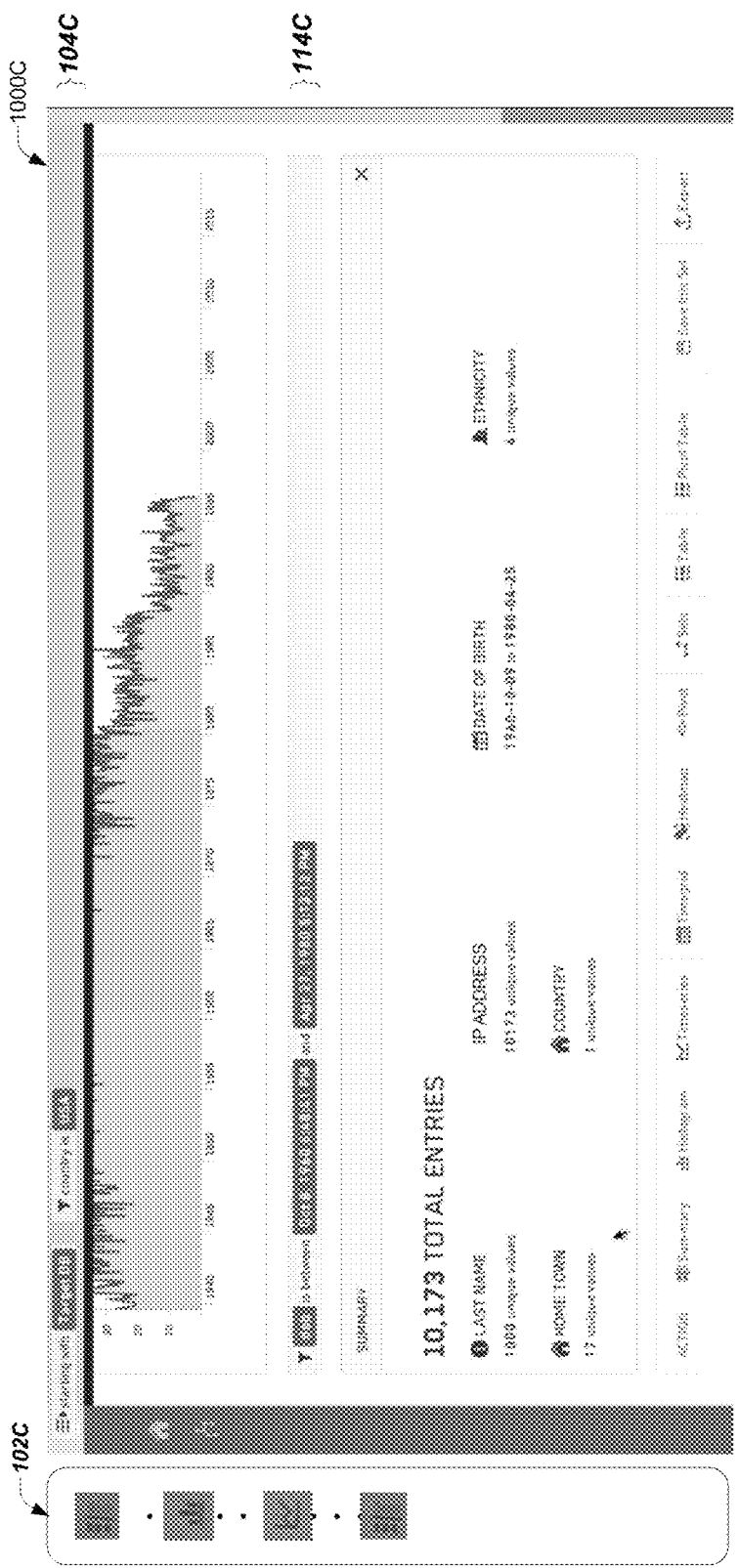

FIG. 1C illustrates an example data analysis user interface 1000C, which may be a continuation of the workflow shown in user interface 1000B. In this continued example of the workflow which started in FIG. 1A, the data analyst has progressed a couple of steps further in the analysis path. The view UI control 102C has been updated to indicate that subsequent to the histogram discussed above, a time series query was processed by the system and the associated time series data visualization (shown partially visible in the user interface 1000C) was generated and displayed. At any point in the analysis the user may use the fully interactive view UI control 102C to navigate to an earlier step in the analysis path; in response, the main data flow user interface may scroll up or otherwise cause re-presentation of the data visualization corresponding to the selected node.

The user interface 1000C also demonstrates the breadcrumb UI control 104C being updated to reflect the user's earlier selection from the histogram to filter on the country "USA." As with the tree view UI control 102C, the user may select any crumb in the breadcrumb UI control 104C to navigate to the corresponding step in the analysis path.

The time series data visualization, like the histogram, may provide several interactive features. For example, in response to the user selecting a segment of the time series, the query filter display 114C may dynamically update to specify a query filter corresponding to the user selection (here, a date range). As user interface 1000C further illustrates, a summary view has been selected again by the data analyst so that she can assess at a glance whether the query filters applied so far in the analysis path have yielded any interesting query results.

Figure 1D:

FIG. 1D illustrates an example data analysis user interface 1000D, which may be a continuation of the workflow shown in user interface 1000C. In this continued example of the workflow which started in FIG. 1A, the analyst has selected a heat map data visualization element 116. The view UI control 102D has been updated to indicate that subsequent to the histogram and time series discussed above, a summary view, a pivot table, and finally the heat map currently displayed were processed by the data analysis system. As before, at any point in the analysis the user may use the fully interactive view UI control 102D to navigate to an earlier step in the analysis path.

The user interface 1000D also demonstrates the breadcrumb UI control 104C being updated to reflect the user's earlier selection from the histogram to filter on the country "USA," as well as several additional interim filters and operations which have been applied during the current analysis path. As with the breadcrumb UI control 104C, the user may select any crumb in the breadcrumb UI control 104D to navigate to the corresponding step in the analysis path.

The heat map data visualization, like the histogram and the time series, may provide several interactive features. For example, in response to the user drawing a circle or otherwise circumscribing an area on the map, the query filter display 114C may dynamically update to specify a query filter corresponding to the user selection (here, a geographic range and a center point).

In the example shown, the user has selected a region roughly corresponding to the New England area, with New York as the center focus. For instance, the query results data may indicate a high degree of activity, such as Internet traffic, satisfying the query parameters in the New York area. The data analyst/user may quickly make this determination from studying the heat map, and then uses the map selector to zoom in on the region of interest. In response the data analysis user interface may interpret the user's map selection as a desire to build a new query and immediately add a query filter, shown below the map in this example, to filter the results to the selected region. The user can then select one of the actions 108D and execute the query filter to view a subsequent data set, where the filter is applied to the query results from the heat map.

FIGS. 1E-1M illustrate additional user interface features that may be implemented in some embodiments in order to selection actions, visualizations, and/or data sets upon which new visualizations should be generated. In this example, a text input control 123 receives text entry from the user in a natural language format; although in other embodiments the text entry may be in a coded, shorthand, or abbreviated format. The text entered by user may then be parsed by the system in order to predict another visualization of interest to the user and/or further filter parameters of interest to the user, such as that might be applied to another visualization.

Figures 1E, 1F:
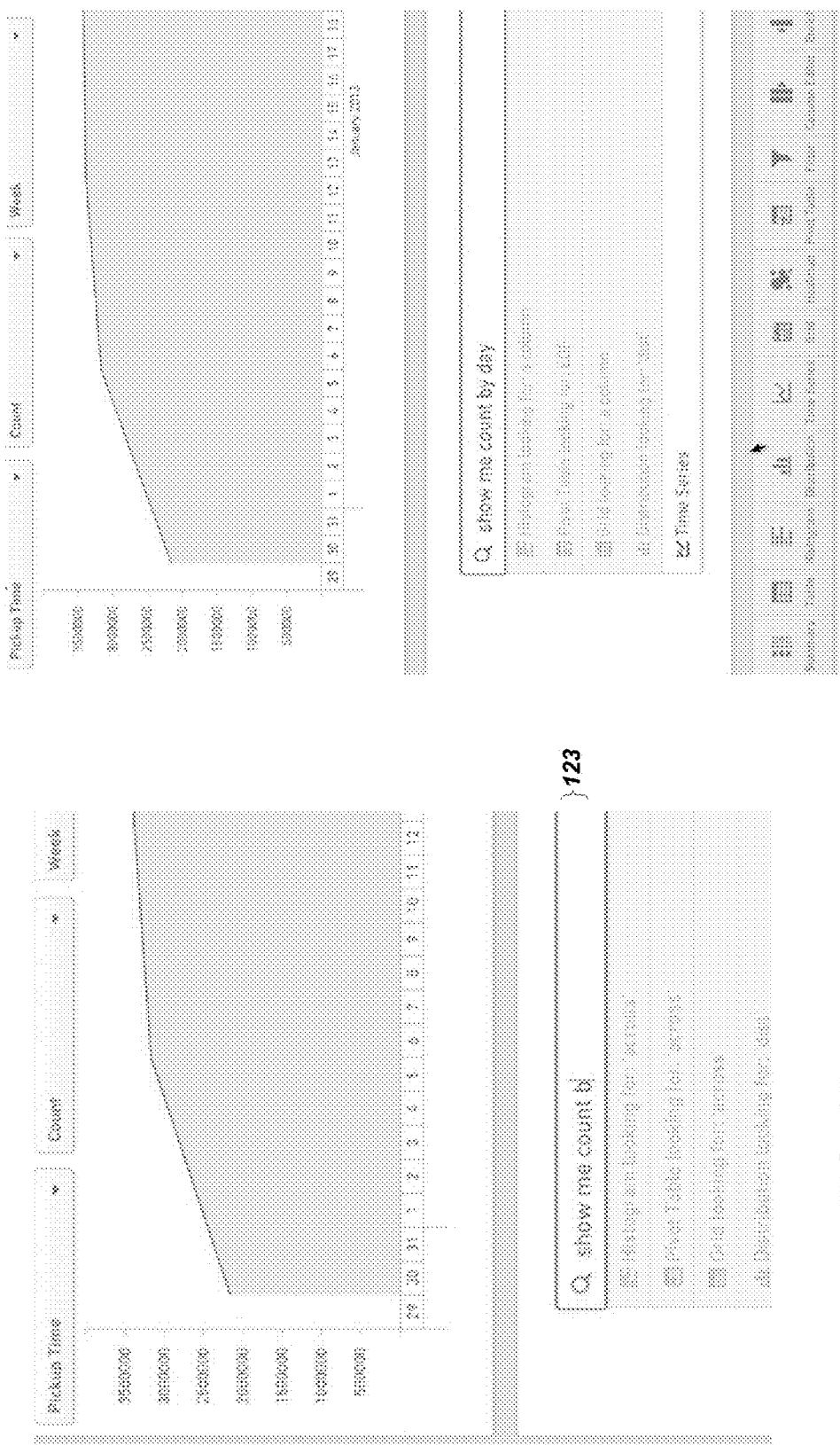

For example, in the example of FIG. 1E, the user has begun typing a query such as "show me count by day." However, before finishing the text, each of the visualizations shown below the input control 123 are grayed out (e.g., not selectable) as the system is processing the text data to determine which visualization is associated with the provided text. In some embodiments, the system provides suggestions of visualizations/or filtering associated with those visualizations before an entire search string is entered. For example, the system may predict characters that are going to be typed by the user. Returning to the example in the figures, when the text has been entered, as in FIG. 1F (or prior to completion of the full text query in some implementations), the dropdown list of visualizations is updated to provide one or more predicted or suggested data visualization elements relevant to the provided text entry. In the example of FIG. 1F, The prediction or suggestion may be based on a real-time analysis of the user input and scanning for certain keywords which may indicate or otherwise suggest that the user is interested in a particular set of data which may be well suited for one or more data visualization types. For example, the word "count" in the user input may signal to the system that the user is probably interested in viewing a time series, and thus this particular data visualization option or thumbnail in the dropdown list may be highlighted so that the user can see that the "time series" data visualization is recommended and/or available for the particular user input or query. As another example, the user input may be "histogram rate code" which may in turn signal the system that the user is probably interested in viewing a histogram; then the histogram option or thumbnail may be highlighted for the user to more easily select.

Figure 1G:
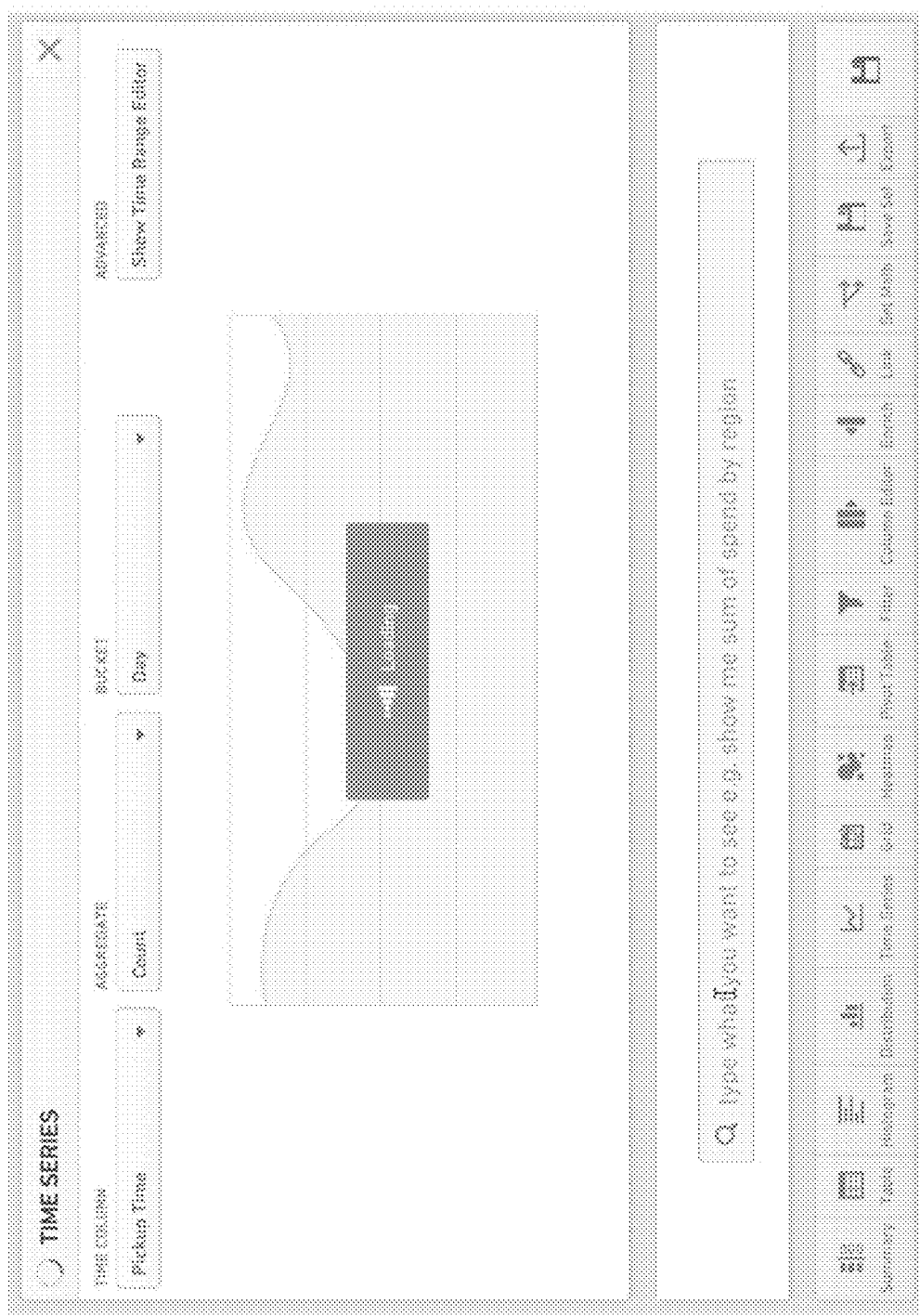
Figure 1J:
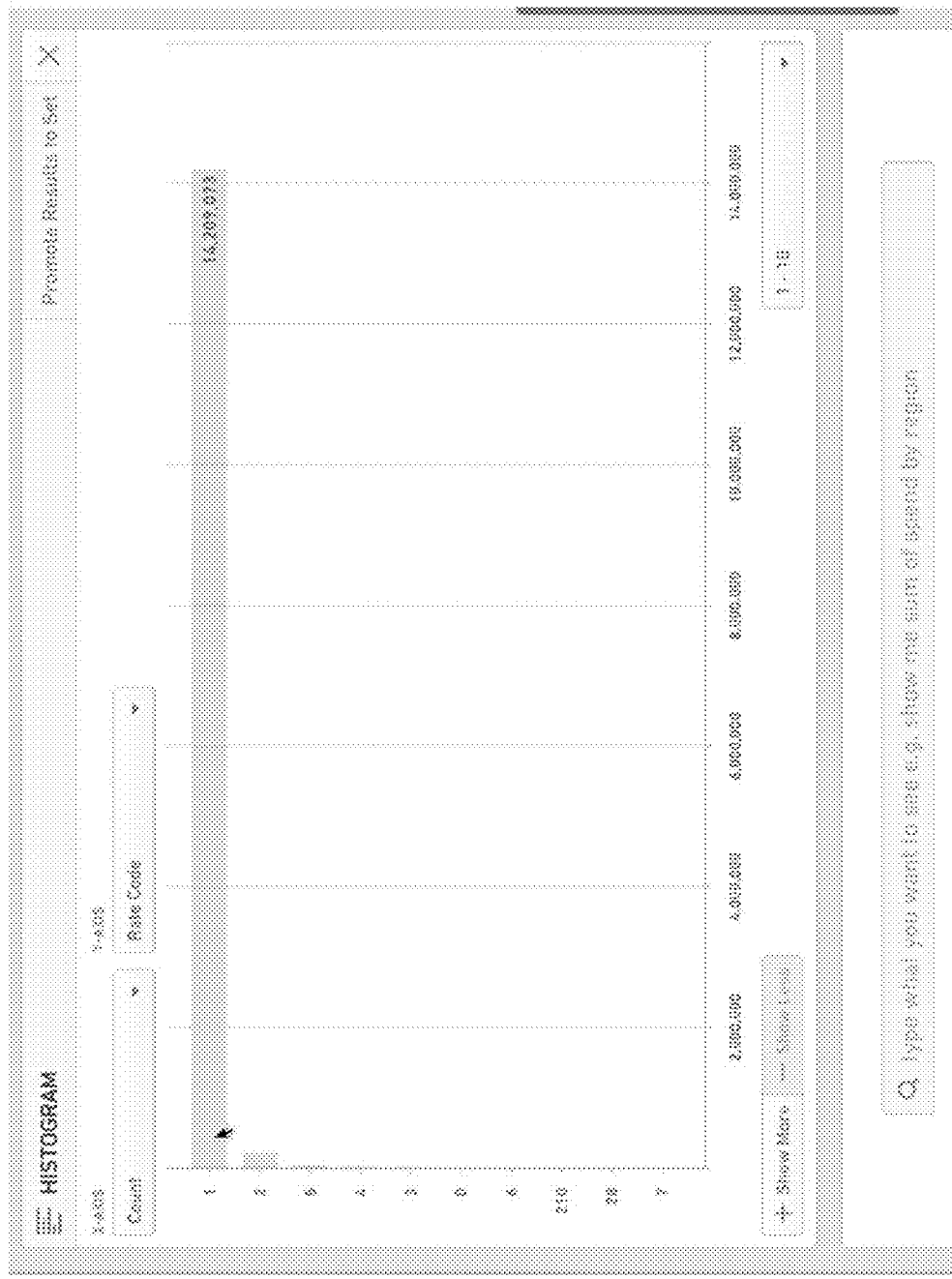

The user can then select any of the available visualizations (e.g., time series in example of FIG. 1) for display in the user interface, such as is shown in FIG. 1G. FIG. 1G also includes an input control 123B that provides the same or similar functionality to the input control 123; that is, free-form text may be entered in order for the system to predict which visualization the user is interested in viewing next and/or additional parameters for filtering the data set in the recommended visualizations. However, the visualization prediction provided in response to text provided into input control 123B may further be influenced by the time series that was previously displayed in response to the previous selection made with reference to FIG. 1G, for example. Thus, as with other examples discussed herein, filtering of the data set and subsequent visualizations based on such filtering may build upon one another in a sequential fashion to provide various granularities, types, and sets of information to the user in various available visualizations.

In the example of FIG. 1H, the user has started typing a new free-form search query, but the system has not yet identified a most appropriate visualization and/or parameters for the visualization. Moving to FIG. 1I, the user has completed entering "histogram rate code", such that a histogram visualization is unlocked for selection, and the system has automatically determined that the "rate code" should be the main input parameter of the histogram. Thus, when the Histogram visualization is selected, a new visualization, such as in FIG. 1J, including a histogram showing rate counts, is added to the user interface.

Figure 1M:
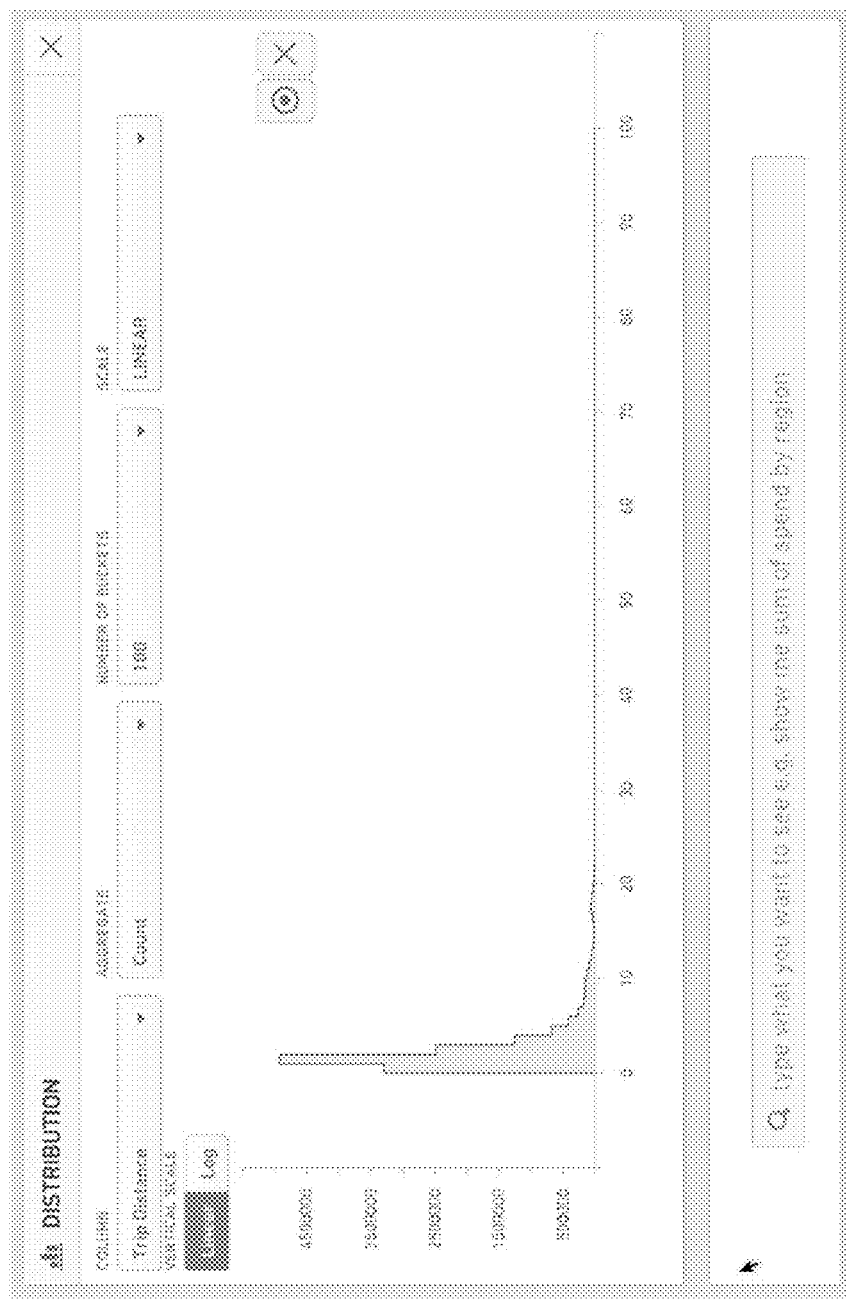

FIGS. 1K-1M illustrate yet another example of parsing of free-form text in order to provide a particular visualization and primary attribute for display in the visualization. In this example, the user has indicated that a distribution visualization is desired, such that the system automatically begins precalculating (in some embodiments) a distribution visualization based on a "trip distance" parameter of the data set, resulting in display of the distribution visualization of FIG. 1M in response to the user's selection of the Distribution visualization (in FIG. 1L).

In some instances, the dropdown list (or other user interface display element listing one or more options for user selection) may display or include a hint for the user to indicate one or more keywords or data types which, if included in the text input, would enable or highlight the particular data visualization element. For example, the list may indicate that, for a pivot table, the system is "looking for" the keyword "across." Then, if the user inputs the term "across" in the text input control, the system may infer that the user is interested in viewing a pivot table and correspondingly enable or recommend the pivot table data visualization. Other examples may include: Grid is looking for the keyword "an aggregate"; Histogram is looking for the keyword "hist"; Distribution is looking for the a data type of "a column," and Time Series is looking for the keyword "time."

Additional keywords may be used or suggested, and more than one keyword may be "looked for" by a particular data visualization to signal the system to generate, enable, or otherwise recommend the particular data visualization to the user. In addition, the data visualization highlighted or recommended by the system may change in real-time as the user provides more input. For example, the system may initially recommend one data visualization such as a Time Series in response to identifying the keyword "time" in the user input; but then update to recommended a different data visualization such as Pivot Table in response to identifying other keywords or structure to the user input that may indicate the user is more likely interested in something other than the initially recommended Time Series data visualization.

Figure 2A:
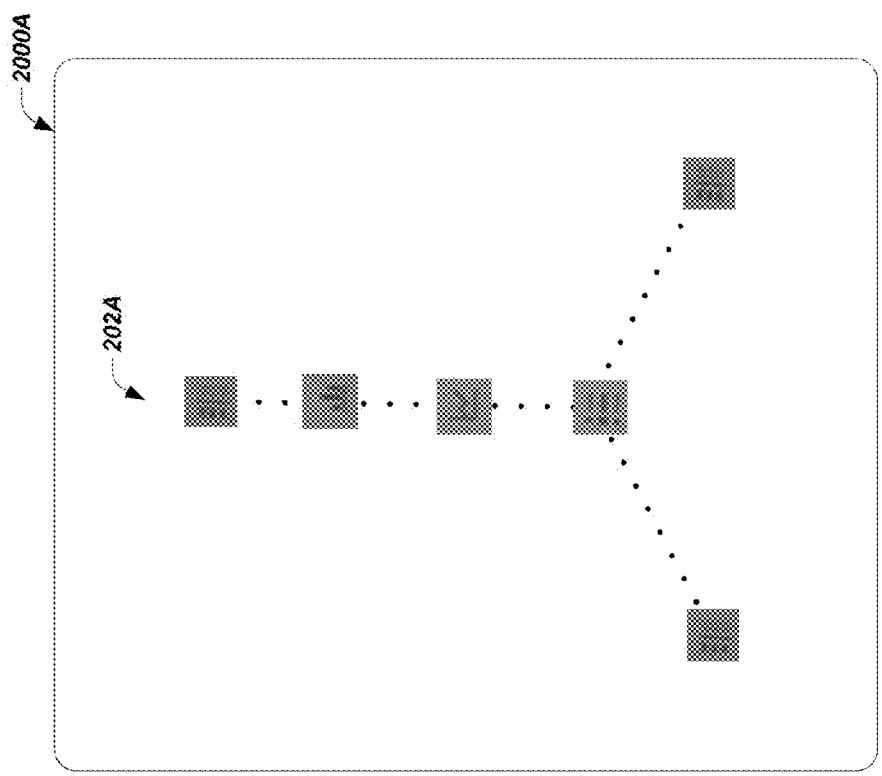
FIGS. 2A-2B illustrate example data analysis path tree view user interfaces, as generated using one embodiment of the data analysis system of FIG. 6.
Figure 2B:
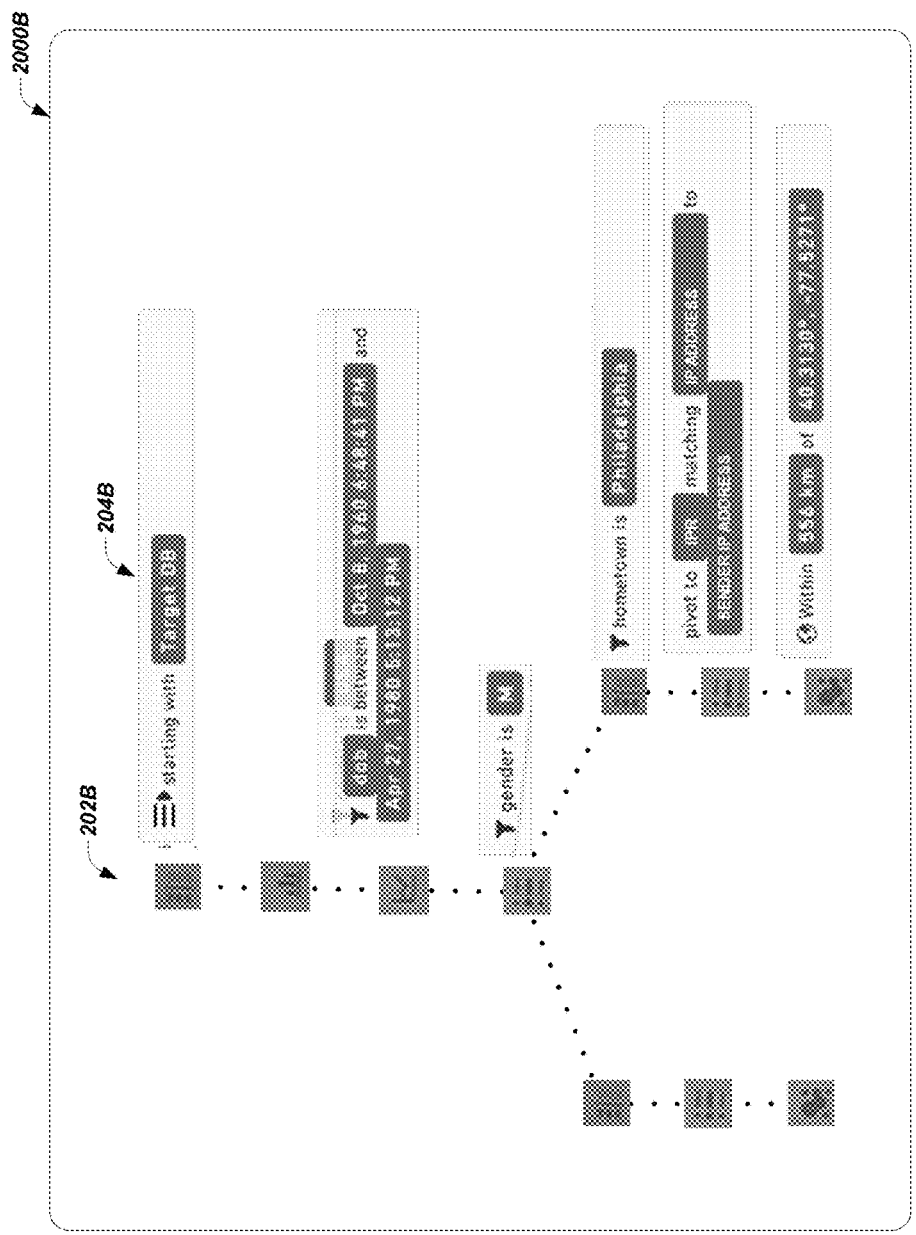

FIGS. 2A-2B illustrates example data analysis path tree view user interfaces, as generated using one embodiment of the data analysis system 100 of FIG. 6. The tree view 202A of FIG. 2A or the tree view 202B of FIG. 2B may be displayed in response to a user selection from the main data workflow user interface. Nodes in each tree view 202A, 202B may be represented by icons indicating the types of query operations or data visualization performed or accessed at the particular node. For example, the tree view 202A includes a summary node, a histogram node, a time series node, a pivot table node, and a summary node on each of two branches from the pivot table node. The tree view 202A may correspond, for example, to some of the analysis path and tree view 102C described in FIG. 1C.

In FIG. 2B, the tree view 202B corresponds to the same analysis path represented in tree view 202A but includes several additional nodes, indicating that the analysis path has grown. For example, the tree view 202B includes the same nodes as tree view 202A, with additional nodes for each of the two branches—namely a table view node and a histogram node.

As further illustrated in FIG. 2B, popover UI elements 204B may be displayed to show query detail (e.g., the associated query parameters and/or type of operation performed). The popover UI elements 204B may be displayed to the right (or left, etc.) of the tree, such as when the user positions a pointer or cursor over a node in the tree view 202A. In some embodiments, only some nodes of tree view 202B display the associated query detail, perhaps indicating certain key nodes in the analysis path. For example, a node's query detail might be selected for display based on a user flag or marker indicating the query result was one of interest for later data exploration; or, the query detail might be selected for display based on a determination made by the data analysis system, such as a based on a number of results returned, or other factors.

In certain embodiments, the tree views 202A, 202B may be interactive such that the user may select a node in order to return to that point in the analysis path. Selection of the node may cause the main data analysis workflow user interface to re-display the associated data query set result and/or visualization control, which the user can view and optionally from which the user can launch a new analysis path.

Although the tree views 202A and 202B shown in FIG. 2A-2B illustrate two branched analysis paths for the current session, in certain embodiments other tree views may be generated to show any number of paths. For example, in one embodiment, a single-path tree view UI control may be presented to show only the current analysis path, for example in a side panel on the main data analysis workflow user interface. An expanded or all-paths tree view UI control may then be displayed in response to user selection of an option presented in one of the data system user interfaces to view the expanded or all-paths tree. In other instances, depending on the depth and complexity of the analysis path, the tree view UI may be generated to display only a local portion of the analysis path, or include a zoom in/zoom out feature to allow the user to navigate the tree view and different analysis path.

In various embodiments, the tree view represents a computation graph (for example, Directed Acyclic Graph) of input sets. Some operations take as input more than just the parent set, and thus form the nodes of a compute graph. Other compute graphs can be used as input at these junctions, and with the added feature of constructing saved sets, these compute graphs can be quite complicated. Thus, one benefit provided by the tree views discussed herein is to allow non-technical users to construct large compute graphs with semantically labeled sets. The data analysis system may be configured to perform some caching on the back-end to optimize the compute profile of particular graphs. This caching can be performed across multiple users, such that if multiple users request the same graph, the result of that compute graph may be cached for speedier or more efficient execution. Elements of the total computation may be optimized by replacing a particular node in the graph with its materialized saved set result (for example, in cases in which the materialization data set remains valid).

Examples of Processes Performed by Data Analysis Systems

Figure 3:
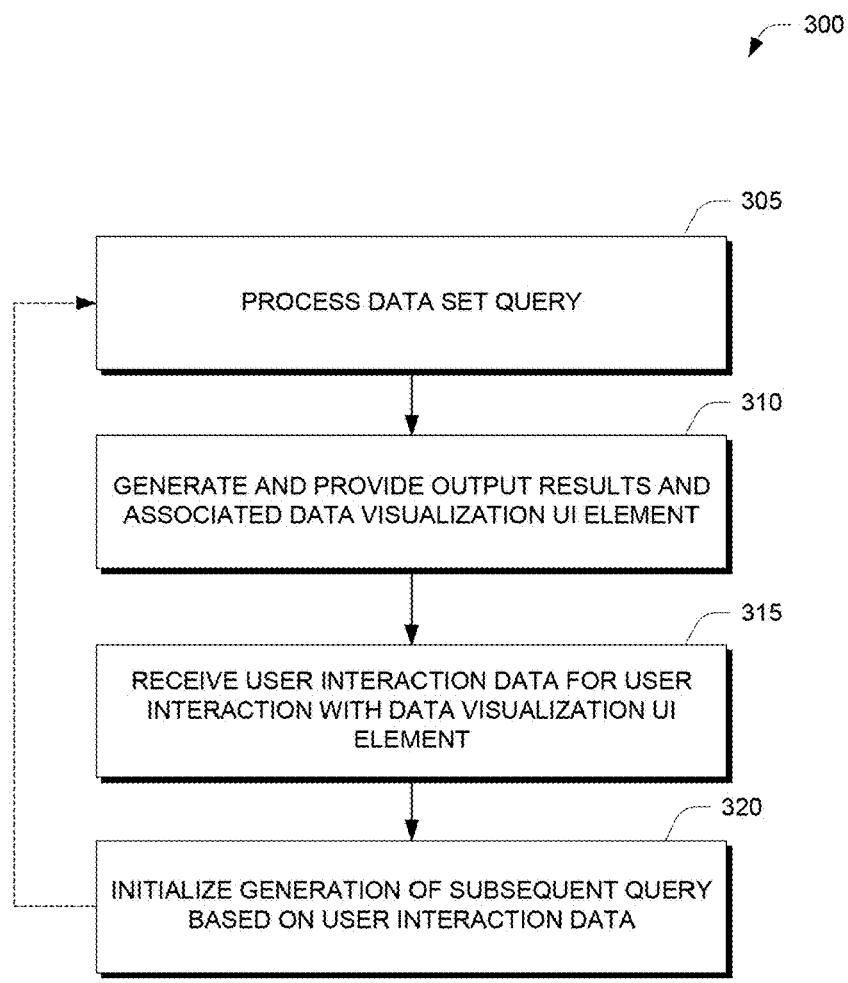
FIG. 3 is a flowchart illustrating one embodiment of an example process for processing data set queries using an interactive data analysis user interface, as used in one embodiment of the data analysis system of FIG. 6.
Figure 4:
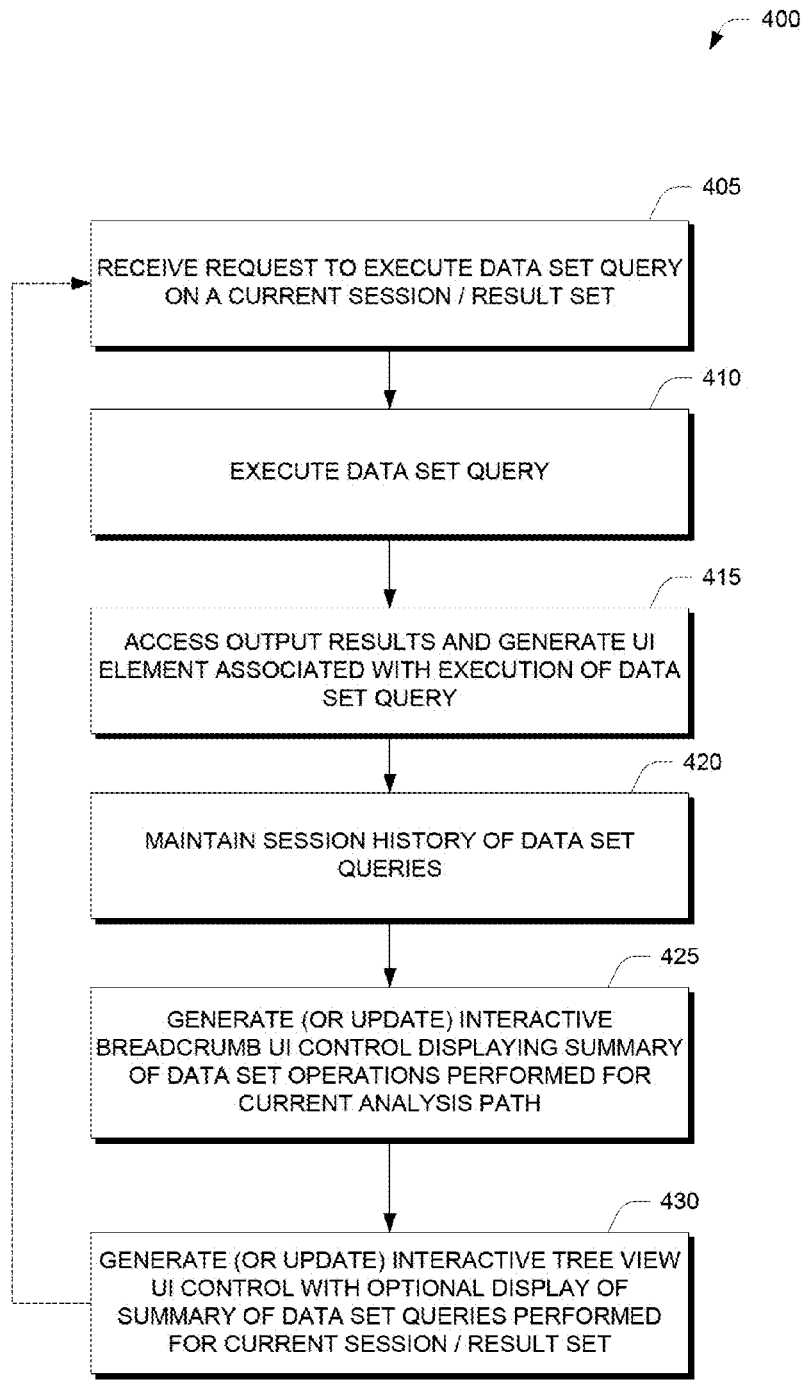
FIG. 4 is a flowchart illustrating one embodiment of an example process for generating an interactive breadcrumb and/or an interactive tree view representing a data analysis path for display in a data analysis user interface, as used in one embodiment of the data analysis system of FIG. 6.
Figure 5:
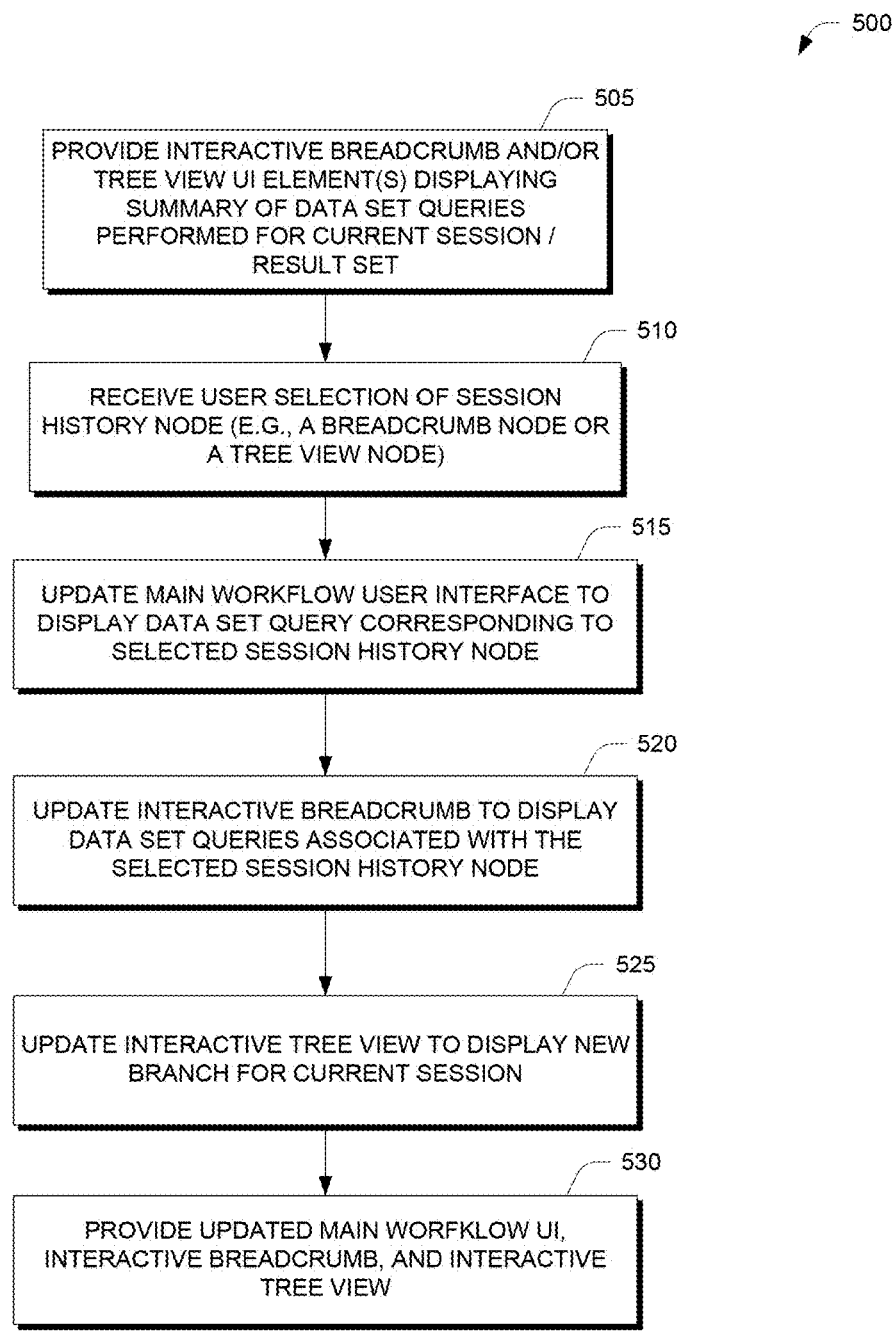
FIG. 5 is a flowchart illustrating one embodiment of an example process for navigating a data analysis path using an interactive breadcrumb and/or an interactive tree view representing the data analysis path in data analysis user interface, as used in one embodiment of the data analysis system of FIG. 6.

FIGS. 3, 4, and 5 are flowcharts illustrating various embodiments of data analysis system processes. In some implementations, the processes are performed by embodiments of the data analysis system 100 described with reference to FIG. 6 and/or by one of its components, such as the network service module 124, the caching module 126, the export service 128, the import service 132, and/or the query backend 134 shown in FIG. 6. For ease of explanation, the following describes the services as performed by the data analysis system 100. The example scenarios are intended to illustrate, but not to limit, various aspects of the data analysis system 100. In one embodiment, the processes can be dynamic, with some procedures omitted and others added.

FIG. 3 is a flowchart illustrating one embodiment of a process 300 for processing data set queries using an interactive data analysis user interface, as used in one embodiment of the data analysis system 100 of FIG. 6. Depending on the embodiment, the method of FIG. 3 may include fewer or additional blocks and/or the blocks may be performed in an order that is different than illustrated.

At block 305, the data analysis system 100 processes a data set query on a data set. The data set may be an unfiltered data set, such as a set of proxy data logs that the user wishes to analysis or may be a filter portion of a data set, such as a subset of the proxy data that was previously processed.

At block 310, the data analysis system 100 generates and provides output results for the data set query, which may include an associated data visualization UI element such as those described herein. The output results and data visualization UI element may be displayed, for example, via one of the example user interfaces 1000A-D discussed above.

At block 315, the data analysis system 100 receives user interaction data for user interaction with the data visualization UI element. For example, the user may interact with the data visualization UI element by selecting one or more bars, lines, or other portions indicating a selection of some subset of the data represented by the data visualization. The selections may then be interpreted as query filters for a subsequent query result set. Several examples of these types of interactions are described with reference to FIGS. 1A-1D.

At block 320, the data analysis system 100 initializes generation of the subsequent query based on the user interaction data. For example, a query filter display may be presented and dynamically updated to include each of the user's selections. Once the user's selections have been received and the user elects to calculate or submit the query, the process 300 may return to block 305 and repeat again. In this way, the user can drill down (and/or up) in various manners to view different subsets of the data in various ways.

FIG. 4 is a flowchart illustrating one embodiment of a process 400 for generating an interactive breadcrumb and/or an interactive tree view representing a data analysis path for display in a data analysis user interface, as used in one embodiment of the data analysis system 100 of FIG. 6. Depending on the embodiment, the method of FIG. 4 may include fewer or additional blocks and the blocks may be performed in an order that is different than illustrated.

At block 405, the data analysis system 100 receives a request to execute a data set query on a current session or result set. The request may be received, for example, via one of the user interfaces 1000A-D described previously, for example over the course of an analysis workflow.

At block 410, the data analysis system 100 executes the data set query, for example by using the caching module 1226 and/or accessing the local data source 170 to run the query. Some or all of the query execution may be performed by, for example, the query backend 134, which may apply some of all of the query optimization techniques described herein.

At block 415, the data analysis system 100 accesses the output results and generates a UI element (e.g., a data visualization control) associated with the execution of the data set query. For example, the type of UI element generated may be based on a user selection from the actions menu 108 illustrated and described with reference to FIG. 1A.

At block 420, the data analysis system 100 maintains or updates a session history of the data set queries executed for the current session. The session history includes the query details associated with each respective data set query, such as query parameters and/or a type of operation performed. The query details may be used, for example, in order to provide a visual reminder to the user about the data set query, as well as to enable re-execution of the query in some instances.

At block 425, the data analysis system 100 generates or updates an interactive breadcrumb UI control (such as the breadcrumb 104A-D to display the summary of the query detail information for data set queries performed for the current analysis path.

At block 430, the data analysis system 100 generates or updates an interactive tree view UI control (such as the tree view 102A-D or 202A-B), which may be configured to optionally display the summary of the query detail information for data set queries performed for the current analysis path (e.g., the query detail information may be displayed in response to a user interaction such as positioning a cursor, gesturing with a finger or hand near the screen, etc.).

Once the interactive breadcrumb and/or tree view UI controls have been updated, the user interfaces 1000, 2000 may be updated or refreshed to display the current view, and the user may continue to build and execute data set queries.

FIG. 5 is a flowchart illustrating one embodiment of a process 500 for navigating a data analysis path using an interactive breadcrumb and/or an interactive tree view representing the data analysis path in data analysis user interface, as used in one embodiment of the data analysis system 100 of FIG. 6. Depending on the embodiment, the method of FIG. 5 may include fewer or additional blocks and the blocks may be performed in an order that is different than illustrated.

At block 505, data analysis system 100 provides for display in a data analysis workflow user interface, an interactive breadcrumb and/or tree view UI element each of which may display summary information about data set queries performed for the current session, analysis path, or result set.

At block 510, data analysis system 100 receivers a user selection of a session history node, such as a crumb in the breadcrumb or a node in the tree view.

At block 515, data analysis system 100 updates the main workflow user interface to display the data set query and results corresponding to the selected session history node.

At block 520, data analysis system 100 updates the interactive breadcrumb to display the data set queries or detail associated with the selected session history node.

At block 525, data analysis system 100 updates the interactive tree view to provide an indication that the current position in the analysis path has changed, and to optionally display a new branch for the current session.

At block 530, data analysis system 100 provides or updates the main workflow user interface as generated at block 515, the interactive breadcrumb as updated at block 520, and the interactive tree view at block 525.

Example System Implementation and Architecture

FIG. 6 is a block diagram of one embodiment of a data analysis system 100 in communication with a network 160 and various systems, such as client computing systems(s) 168, external data source(s) 172. The data analysis system 100 may be used to implement systems and methods described herein, including, but not limited to the process 300 of FIG. 3, the process 400 of FIG. 4 and the process 500 of FIG. 5.

Data Analysis System

In the embodiment of FIG. 6, the data analysis system 100 includes a network service module 124, a caching module 126, an export service 128, an import service 130, a query backend 134, and a local data source 170.

The security/single sign-on manager 122 provides capabilities to ensure that users are properly authenticated with the data analysis system 100, as well as other security measures and protocols which may be used by the data analysis system 100.

The network service module 124 provides capabilities related to generation, presentation, and in some cases display of the user interfaces, UI components, and related features, such as those illustrated and described with reference to FIGS. 1A-1D and 2A-2D herein.

The caching module 126 provides capabilities related to, among other things, caching of query results generated for analysis workflow sessions. The caching module 126 may also be configured to manage connection pooling for the data analysis system 100, such that users of the system are mapped to temp tables created for their respective analysis workflows. Among other benefits this may help improve response times for the users as they may utilize the same connection and same temp tables many times over a single session.

The export service 128 processes requests to export data from the data analysis system 100 to, for example, the external data sources(s) 172, working in association with the caching module 126 to access data and provide it to the network service module 124 for export.

The import service 132 may periodically poll or be notified by the external data source(s) 172 when new data may be available for import. When new data is available for import, the import service 132 may update the local data store 170 and provide an indication to the caching module 126 that new data is available. In response the caching module 126 may purge or invalidate outdated data.

The query backend 134 provides capabilities related to query optimization including analyzing query filters received from the network service module 124.

Each of these components may be stored in a mass storage device as executable software codes that are executed by a central processing units ("CPU"). These and other modules in the data analysis system 100 may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 6, the data analysis system 100 is configured to execute the modules recited above to perform the various methods and/or processes herein (such as the processes described with respect to FIGS. 3, 4, and 5 herein).

The data analysis system 100 and/or its subcomponents may include, for example, a server, workstation, or other computing device. In one embodiment, the exemplary data analysis system 100 includes CPUs, which may each include a conventional or proprietary microprocessor. The data analysis system 100 further includes one or more memories, such as random access memory ("RAM") for temporary storage of information, one or more read only memories ("ROM") for permanent storage of information, and one or more mass storage devices, such as a hard drive, diskette, solid state drive, or optical media storage device. Typically, the modules of the data analysis system 100 are connected to the computer using a standard based bus system. In different embodiments, the standard based bus system could be implemented in Peripheral Component Interconnect ("PCI"), Microchannel, Small Computer System Interface ("SCSI"), Industrial Standard Architecture ("ISA"), and Extended ISA ("EISA") architectures, for example. In addition, the functionality provided for in the components and modules of data analysis system 100 may be combined into fewer components and modules or further separated into additional components and modules.

The data analysis system 100 and/or its subcomponents are generally controlled and coordinated by operating system software, such as Windows XP, Windows Vista, Windows 7, Windows 8, Windows Server, UNIX, Linux, SunOS, Solaris, iOS, Blackberry OS, or other compatible operating systems. In Macintosh systems, the operating system may be any available operating system, such as MAC OS X. In other embodiments, the data analysis system 100 may be controlled by a proprietary operating system. Conventional operating systems control and schedule computer processes for execution, perform memory management, provide file system, networking, I/O services, and provide a user interface, such as a graphical user interface ("GUI"), among other things.

Network

In the embodiment of FIG. 6, the data analysis system 100 is electronically coupled to a network 160, which comprises one or more of a LAN, WAN, and/or the Internet, for example, via a wired, wireless, or combination of wired and wireless, communication link. The network 160 communicates with various computing devices and/or other electronic devices via wired or wireless communication links.

According to FIG. 6, in some embodiments information may be provided to or accessed by the data analysis system 100 over the network 160 from one or more external data source(s) 172. The local data store 170 and/or external data source(s) 172 may include one or more internal and/or external data sources. In some embodiments, one or more of the databases or data sources may be implemented using a relational database, such as Sybase, Oracle, CodeBase, MySQL, and Microsoft® SQL Server as well as other types of databases such as, for example, a flat file database, an entity-relationship database, and object-oriented database, and/or a record-based database Other Embodiments Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the programming notebook system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the programming notebook system 100 and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A computer system comprising:
   one or more computer processors configured to execute software code; and
   a non-transitory storage medium storing software code that, when executed by the one or more computer processors causes the one or more computer processors to:
   generate a first data visualization representing a first set of data items;
   receive a selection of an element of the first data visualization representing a subset of the first set of data items;
   generate, based on the selection, a second data visualization representing the subset of the first set of data items; and
   generate an analysis path visualization including a visual representation of the first data visualization and a visual representation of the second data visualization, wherein the analysis path visualization is rendered as a hierarchical plurality of nodes wherein at least one or more nodes of the hierarchical plurality of nodes indicates query information selected by a user.

2. The computer system of claim 1, wherein the software code, in response to execution by the one or more computer processors, further causes the one or more computer processors to:
generate a user interface including first data visualization, the second data visualization, and the analysis path visualization; and
cause display of the user interface in an electronic display.

3. The computer system of claim 1, wherein generating the second data visualization comprises:
generating, based on the subset of the first set of data items, a query to apply to the first set of data.

4. The computer system of claim 3, wherein the query comprises one or more filters to apply to the first set of data, wherein the one or more filters are based on the selection.

5. The computer system of claim 1, wherein the first or second data visualization comprises at least one of: a time series view, a time grid view, a pivot table view, or a data summary view.

6. The computer system of claim 1, wherein the software code, in response to execution by the one or more computer processors, further causes the one or more computer processors to:
receive a selection of an element of the second data visualization representing a subset of the first set of data items;
generate, based at least in part on the selection of the element of the second data visualization, a third data visualization; and
update the analysis path visualization to include a visual representation of the third data visualization.

7. The computer system of claim 6, wherein generating the third data visualization comprises:
generating, based at least in part on the selection of the element of the second data visualization, a query to apply to one or more sets of data including the first set of data.

8. The computer system of claim 7, wherein the query comprises a join operation to be performed with respect to a second set of data distinct from the first set of data.

9. The computer system of claim 1, wherein the selection comprises an indication of a range of values.

10. The computer system of claim 1, wherein the visual representations of the first and second data visualizations are selectable, and wherein the software code, in response to execution by the one or more computer processors, further causes the one or more computer processors to:
in response to selection of the visual representation of the first data visualization, cause display of the first data visualization in a user interface; and
in response to selection of the visual representation of the second data visualization, cause display of the second data visualization in the user interface.

11. A computer-implemented method comprising:
by one or more computer processors executing software code:
generating a first data visualization representing a first set of data items;
receiving a selection of an element of the first data visualization representing a subset of the first set of data items;
generating, based on the selection, a second data visualization representing the subset of the first set of data items; and
generating an analysis path visualization including a visual representation of the first data visualization and a visual representation of the second data visualization, wherein the analysis path visualization is rendered as a hierarchical plurality of nodes wherein at least one or more nodes of the hierarchical plurality of nodes indicates query information selected by a user.

12. The computer-implemented method of claim 11 further comprising:
by the one or more computer processors executing software code:
generating a user interface including first data visualization, the second data visualization, and the analysis path visualization; and
causing display of the user interface in an electronic display.

13. The computer-implemented method of claim 11, wherein generating the second data visualization comprises:
by the one or more computer processors executing software code:
generating, based on the subset of the first set of data items, a query to apply to the first set of data, wherein the query comprises one or more filters to apply to the first set of data, wherein the one or more filters are based on the selection.

14. The computer-implemented method of claim 11 further comprising:
by the one or more computer processors executing software code:
receiving a selection of an element of the second data visualization representing a subset of the first set of data items;
generating, based at least in part on the selection of the element of the second data visualization, a third data visualization; and
updating the analysis path visualization to include a visual representation of the third data visualization.

15. The computer-implemented method of claim 14, wherein generating the third data visualization comprises:
by the one or more computer processors executing software code:
generating, based at least in part on the selection of the element of the second data visualization, a query to apply to one or more sets of data including the first set of data.

16. The computer-implemented method of claim 15, wherein the query comprises a join operation to be performed with respect to a second set of data distinct from the first set of data.

17. The computer-implemented of claim 11, wherein the selection comprises an indication of a range of values.

18. The computer-implemented method of claim 11, wherein the visual representations of the first and second data visualizations are selectable, and wherein the computer-implemented method further comprises:
by the one or more computer processors executing software code:
in response to selection of the visual representation of the first data visualization, causing display of the first data visualization in a user interface; and
in response to selection of the visual representation of the second data visualization, causing display of the second data visualization in the user interface.

19. The computer-implemented method of claim 11, wherein the analysis path visualization includes a visual representation of multiple paths associated with a plurality of data visualizations including the first data visualization and the second data visualization.

20. A non-transitory computer readable storage medium having computer-executable instructions stored thereon, the computer-executable instructions executable by a computing system having one or more hardware processors, wherein the computer-executable instructions are executable to perform operations comprising:
  generating a first data visualization representing a first set of data items;
  receiving a selection of an element of the first data visualization representing a subset of the first set of data items;
  generating, based on the selection, a second data visualization representing the subset of the first set of data items; and
  generating an analysis path visualization including a visual representation of the first data visualization and a visual representation of the second data visualization, wherein the analysis path visualization is rendered as a hierarchical plurality of nodes wherein at least one or more nodes of the hierarchical plurality of nodes indicates query information selected by a user.

* * * * *

UNITED STATES PATENT AND TRADEMARK OFFICE
CERTIFICATE OF CORRECTION

PATENT NO. : 10,157,200 B2
APPLICATION NO. : 15/092964
DATED : December 18, 2018
INVENTOR(S) : Mark Elliot et al.

Page 1 of 1

It is certified that error appears in the above-identified patent and that said Letters Patent is hereby corrected as shown below:

In the Specification

In Column 9 at Line 43, Change "in on" to --in--.

In Column 10 at Line 11, Change "The" to --the--.

In Column 11 at Line 12, Change "the a" to --the--.

In Column 12 at Line 7, Change "FIG." to --FIGS.--.

In Column 16 at Line 28, Change "database" to --database.--.

In the Claims

In Column 18 at Lines 54-57, In Claim 1, change "a non-transitory storage medium storing software code that, when executed by the one or more computer processors causes the one or more computer processors to:" to --a computer-readable storage medium storing software code that, in response to execution by the one or more computer processors, causes the one or more computer processors to:--.

In Column 20 at Line 54, In Claim 17, after "implemented" insert --method--.

Signed and Sealed this
Second Day of April, 2019

Andrei Iancu
*Director of the United States Patent and Trademark Office*